(12) United States Patent
Sturtevant et al.

(10) Patent No.: US 11,126,427 B2
(45) Date of Patent: Sep. 21, 2021

(54) COMPUTER-IMPLEMENTED METHODS AND SYSTEMS FOR MEASURING, ESTIMATING, AND MANAGING ECONOMIC OUTCOMES AND TECHNICAL DEBT IN SOFTWARE SYSTEMS AND PROJECTS

(71) Applicant: Silverthread, Inc., Cambridge, MA (US)

(72) Inventors: Daniel J. Sturtevant, Newton, MA (US); Carliss Baldwin, Brookline, MA (US); Alan MacCormack, Wellesley, MA (US); Sunny Ahn, West Newbury, MA (US); Sean Gilliland, Reno, NV (US)

(73) Assignee: Silverthread, Inc., Newton, MA (US)

( * ) Notice: Subject to any disclaimer, the term of this patent is extended or adjusted under 35 U.S.C. 154(b) by 99 days.

(21) Appl. No.: 15/436,462

(22) Filed: Feb. 17, 2017

(65) Prior Publication Data

US 2017/0235569 A1  Aug. 17, 2017

Related U.S. Application Data

(60) Provisional application No. 62/296,376, filed on Feb. 17, 2016.

(51) Int. Cl.
*G06F 9/44* (2018.01)
*G06F 8/77* (2018.01)
(Continued)

(52) U.S. Cl.
CPC ......... *G06F 8/77* (2013.01); *G06Q 10/06393* (2013.01); *G06Q 40/12* (2013.12)

(58) Field of Classification Search
None
See application file for complete search history.

(56) References Cited

U.S. PATENT DOCUMENTS 7,890,924 B2   2/2011  Raffo
8,578,348 B2  11/2013  Fliess et al.
(Continued)

FOREIGN PATENT DOCUMENTS

KR   20100070206 A   6/2010

OTHER PUBLICATIONS

Nugroho et al. "An Empirical Model of Technical Debt and Interest," ACM, 2011.*
(Continued)

*Primary Examiner* — Insun Kang
(74) *Attorney, Agent, or Firm* — Foley Hoag LLP; Rajesh Vallabh

(57) ABSTRACT

An interrelated set of tools and methods is disclosed for: (1) measuring the relationship between software source code attributes (such as code quality, design quality, test quality, and complexity metrics) and software economics outcome metrics (such as maintainability, agility, and cost) experienced by development and maintenance organizations, (2) using this information to project or estimate the level of technical debt in a software codebase, (3) using this information to estimate the financial value of efforts focused on improving the codebase (such as rewriting or refactoring), and (4) using this information to help manage a software development effort over its lifetime so as to improve software economics, business outcomes, and technical debt while doing so.

10 Claims, 35 Drawing Sheets

(51) Int. Cl.
*G06Q 40/00* (2012.01)
*G06Q 10/06* (2012.01)

(56) References Cited

U.S. PATENT DOCUMENTS

| | | | | |
|---|---|---|---|---|
| 8,584,079 B2* | 11/2013 | Yassin | | G06F 11/3672 |
| | | | | 717/101 |
| 8,627,287 B2* | 1/2014 | Fanning | | G06F 8/75 |
| | | | | 717/124 |
| 9,600,395 B2* | 3/2017 | Salecker | | G06F 8/70 |
| 10,127,038 B1* | 11/2018 | Ganesan | | G06F 8/71 |
| 2005/0137950 A1 | 6/2005 | Palozzi et al. | | |
| 2005/0160103 A1* | 7/2005 | Raffo | | G06Q 10/06 |
| 2005/0289503 A1* | 12/2005 | Clifford | | G06F 8/20 |
| | | | | 717/101 |
| 2011/0055799 A1* | 3/2011 | Kaulgud | | G06F 11/3616 |
| | | | | 717/101 |
| 2011/0276354 A1* | 11/2011 | Bijani | | G06Q 10/00 |
| | | | | 705/7.11 |
| 2012/0060142 A1* | 3/2012 | Fliess | | G06F 8/70 |
| | | | | 717/102 |
| 2012/0131540 A1* | 5/2012 | Mendis | | G06F 8/77 |
| | | | | 717/101 |
| 2013/0152042 A1* | 6/2013 | Bennett | | G06F 8/70 |
| | | | | 717/110 |
| 2013/0152047 A1* | 6/2013 | Moorthi | | G06F 11/368 |
| | | | | 717/124 |
| 2014/0040871 A1* | 2/2014 | Schwan | | G06F 8/71 |
| | | | | 717/141 |
| 2015/0363292 A1 | 12/2015 | Shiraishi | | |
| 2017/0031800 A1* | 2/2017 | Shani | | G06F 8/77 |
| 2017/0185931 A1* | 6/2017 | Bhojan | | G06F 11/3692 |
| 2018/0307481 A1* | 10/2018 | Ganesan | | G06F 8/71 |
| 2018/0374024 A1* | 12/2018 | Cai | | G06F 11/36 |

OTHER PUBLICATIONS

Juha Viljanen, Measuring software maintainability, Aalto University, Aug. 10, 2015.*
Curtis et al., Estimating the Size, Cost, and Types of Technical Debt, 2012 IEEE.*
Michail Kuznetcov, Measuring Architectural Technical Debt, Radboud University, Aug. 28, 2014.*
International Search Report dated Jun. 7, 2017 in International Application No. PCT/US2017/018477.

* cited by examiner

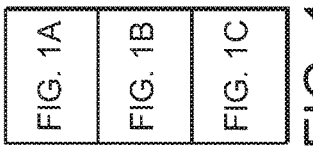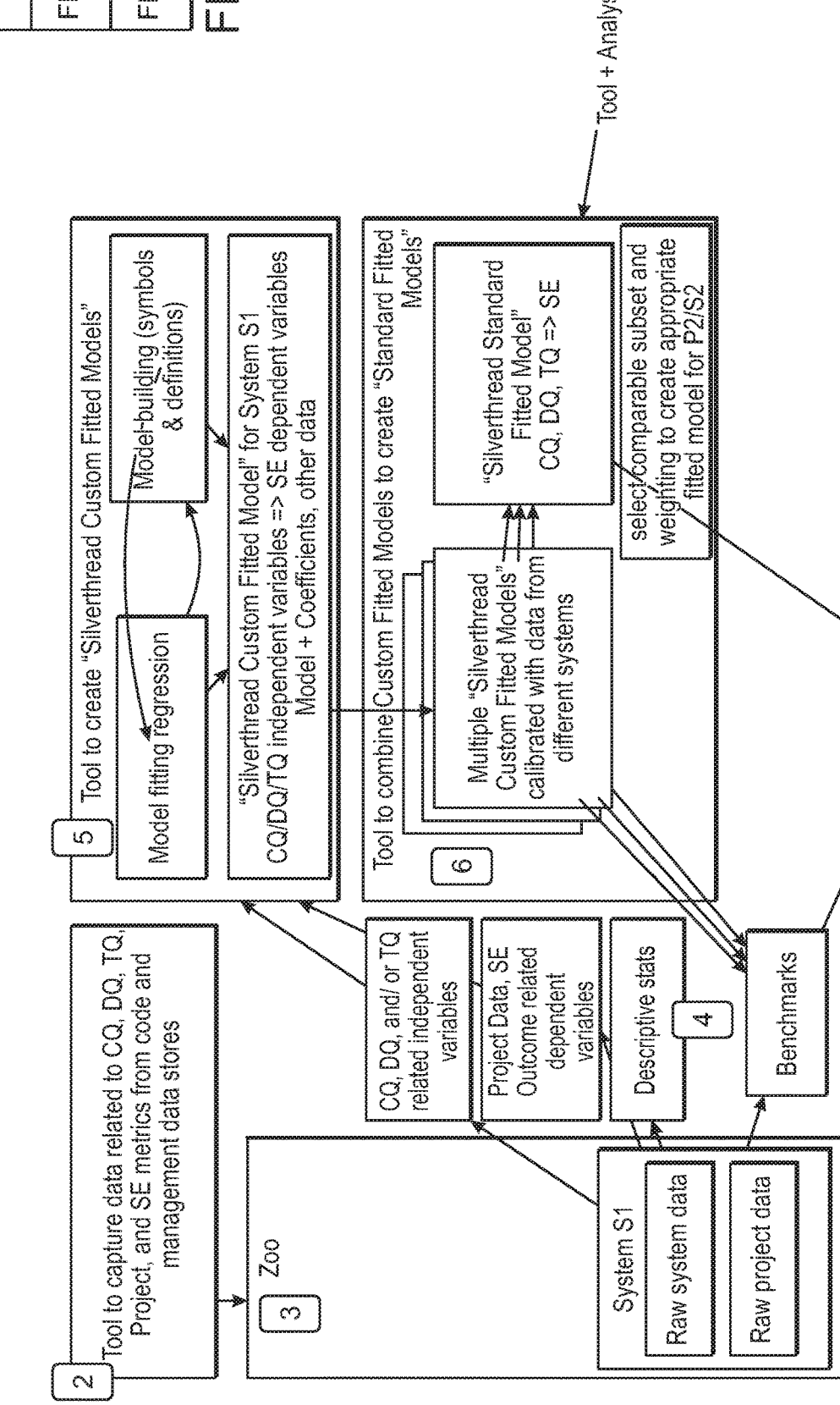
FIG. 1A

Abbreviations: CQ = Code Quality, DQ = Design Quality, TQ = Test Quality, SE = Software Economics

| Filename | Language | LOC | DQ - "Core Periphery Type" | CQ - Cyclomatic Complexity | TQ - Test Coverage | SE - LOC modified to enhance product in prior year | SE - LOC modified to fix bugs in prior year |
|---|---|---|---|---|---|---|---|
| file001 | C# | 100 | Core | Low | 10% | 10 | 0 |
| file002 | C# | 100 | Core | Low | 30% | 20 | 0 |
| file003 | C++ | 100 | Control | Untestable | 30% | 30 | 0 |
| file004 | C++ | 100 | Control | Medium | 30% | 30 | 10 |
| file005 | Java | 200 | Peripheral | High | 30% | 30 | 50 |
| file006 | Java | 200 | Shared | High | 90% | 0 | 70 |
| file007 | Java | 200 | Peripheral | High | 90% | 0 | 0 |
| file008 | Java | 200 | Unconnected | High | 95% | 0 | 0 |

FIG. 8

|  | LOC | Files | LOC% | Files% |
|---|---|---|---|---|
| Control | 200 | 4 | 21.1% | 21.1% |
| Core | 350 | 6 | 36.8% | 31.6% |
| Periphery | 100 | 3 | 10.5% | 15.8% |
| Shared | 250 | 4 | 26.3% | 21.1% |
| Unconnected | 50 | 2 | 5.3% | 10.5% |
| Total | 950 | 19 | 100% | 100% |

|  | LOC | Files | LOC% | Files% |
|---|---|---|---|---|
| Low | 100 | 7 | 10.5% | 36.8% |
| Medium | 250 | 5 | 26.3% | 26.3% |
| High | 200 | 2 | 21.1% | 10.5% |
| Untestable | 400 | 5 | 42.1% | 26.3% |
| Total | 950 | 19 | 100% | 100% |

FIG. 9

Table 5: File Count Broken Down by Complexity Classification

| Release | 1 | 2 | 3 | 4 | 5 | 6 | 7 | 8 |
|---|---|---|---|---|---|---|---|---|
| Total number of files | 9937 | 10447 | 10671 | 11576 | 12186 | 12311 | 13295 | 13941 |
| Architectural complexity classification | | | | | | | | |
| *Peripheral* | 2691 | 2305 | 2158 | 2193 | 1835 | 2981 | 1975 | 1901 |
| *Utility* | 543 | 602 | 636 | 915 | 679 | 780 | 685 | 718 |
| *Control* | 3262 | 3503 | 3371 | 3564 | 3923 | 2704 | 4127 | 4461 |
| *Core* | 3441 | 4037 | 4506 | 4904 | 5749 | 5846 | 6508 | 6861 |
| Component complexity classification | | | | | | | | |
| *McCabe Low* | 5973 | 6321 | 6534 | 7282 | 7702 | 7904 | 8691 | 9241 |
| *McCabe Mid* | 2076 | 2174 | 2206 | 2336 | 2436 | 2412 | 2565 | 2645 |
| *McCabe High* | 1448 | 1506 | 1499 | 1506 | 1586 | 1567 | 1611 | 1616 |
| *McCabe Very High* | 440 | 446 | 432 | 452 | 462 | 428 | 428 | 439 |
| Mean McCabe Score | 14.32 | 13.92 | 13.50 | 12.98 | 12.80 | 12.42 | 11.92 | 11.51 |

FIG. 10

Table 6: Measures of Development Activity During Each Release

| Release | 1 | 2 | 3 | 4 | 5 | 6 | 7 | 8 |
|---|---|---|---|---|---|---|---|---|
| Total number of files | 9937 | 10447 | 10671 | 11576 | 12186 | 12311 | 13295 | 13941 |
| Number of files modified | 2139 | 2844 | 3778 | 3414 | 3649 | 3452 | 3702 | 3150 |
| for features & tasks | 1462 | 2228 | 2840 | 2584 | 2834 | 2755 | 2882 | 2453 |
| for bug fixes | 1356 | 1502 | 1980 | 1847 | 1980 | 1759 | 2046 | 1612 |
| Number of changes | 6019 | 7728 | 10343 | 10515 | 10601 | 10085 | 11439 | 8203 |
| for features & tasks | 3153 | 4643 | 6210 | 6630 | 6273 | 6101 | 6473 | 5055 |
| for bug fixes | 2866 | 3085 | 4133 | 3885 | 4328 | 3984 | 4966 | 3148 |
| Number of lines in files | 5627014 | 5953113 | 6047870 | 6277627 | 6772103 | 6891070 | 7096692 | 7239940 |
| Number of lines modified | 360403 | 509704 | 632241 | 645008 | 713688 | 596700 | 674741 | 504823 |
| for features & tasks | 198508 | 332628 | 439290 | 445008 | 485146 | 407988 | 445833 | 350248 |
| for bug fixes | 161895 | 177076 | 192951 | 200000 | 228542 | 188712 | 228908 | 154575 |

FIG. 11

Table 7: Averages for File Size, Change Size, and Development Activity During Each Release

| Release | 1 | 2 | 3 | 4 | 5 | 6 | 7 | 8 |
|---|---|---|---|---|---|---|---|---|
| Mean file age | 3.70 | 3.78 | 3.94 | 4.12 | 4.21 | 4.37 | 4.57 | 4.61 |
| Mean file size | 566.27 | 569.84 | 566.76 | 542.30 | 555.73 | 559.75 | 533.79 | 519.33 |
| Mean change size | 59.88 | 65.96 | 61.13 | 61.34 | 67.32 | 59.17 | 58.99 | 61.54 |
| Mean changes per file | 0.61 | 0.74 | 0.97 | 0.91 | 0.87 | 0.82 | 0.86 | 0.59 |
| for *feature & tasks* | 0.32 | 0.44 | 0.58 | 0.57 | 0.51 | 0.50 | 0.49 | 0.36 |
| for *bug fixes* | 0.29 | 0.30 | 0.39 | 0.34 | 0.36 | 0.32 | 0.37 | 0.23 |
| Mean lines changed per file | 36.27 | 48.79 | 59.25 | 55.72 | 58.57 | 48.47 | 50.75 | 36.21 |
| for *feature & tasks* | 19.98 | 31.84 | 41.17 | 38.44 | 39.81 | 33.14 | 33.53 | 25.12 |
| for *bug fixes* | 16.29 | 16.95 | 18.08 | 17.28 | 18.75 | 15.33 | 17.22 | 11.09 |

FIG. 12

| Predicting LOC Changed in a File to Fix Bugs. (Negative Binomial Model) ||||||||
|---|---|---|---|---|---|---|---|
| Parameter | Model 1: controls | | Model 2: cyclomatic complexity | | Model 3: architectural complexity | | Model 4: combined | |
| LOC in file | 0.00156486 | *** | 0.0011712 | *** | 0.00143183 | *** | 0.00104115 | *** |
| Non-bug lines change | 0.00372536 | *** | 0.00353601 | *** | 0.00355368 | *** | 0.00335322 | *** |
| File age | -0.10050305 | *** | -0.11730352 | *** | -0.1026859 | *** | -0.11853279 | *** |
| Cyclomatic: mid | | | 0.774729 | *** | | | 0.70392074 | *** |
| Cyclomatic: high | | | 0.93363115 | *** | | | 0.95513134 | *** |
| Cyclomatic: very high | | | 0.91923347 | *** | | | 0.96444595 | *** |
| Architectural: utility | | | | | 0.2018549 | * | 0.35797922 | *** |
| Architectural: control | | | | | 0.94111466 | *** | 0.84721344 | *** |
| Architectural: core | | | | | 1.14823521 | *** | 1.14683088 | *** |
| Residual Deviance | 30370 | | 30418 | | 30428 | | 30475 | |
| Degrees of Freedom | 94353 | | 94350 | | 94350 | | 94347 | |
| AIC | 227861 | | 227512 | | 227403 | | 227079 | |
| Theta | 0.030212 | | 0.030692 | | 0.030836 | | 0.031295 | |
| Std-err | 0.000285 | | 0.00029 | | 0.000291 | | 0.000295 | |
| 2 x log-lik | -227837.302 | | -227482.025 | | -227373.406 | | -227042.861 | |
| *N = 94364 files observations (from 8 releases)* ||||||||
| *Dummy variables for each of 8 releases omitted.* ||||||||
| *Significance codes: .<0.1, *<0.05, **<0.01, ***<0.001* ||||||||

FIG. 15

| Predicting LOC Produced per Developer For One Release. (Neg Binomial Panel Data Model) | | | | | | | | | | | |
|---|---|---|---|---|---|---|---|---|---|---|---|
| Parameter | Model 1: developer attributes | | Model 2: type of work | | Model 3: cyclomatic complexity | | Model 4: all controls | | Model 5: architectural complexity | | Model 6: combined | |
| log (years employed) | 0.233711 | | | | | | 0.32335 | * | | | 0.336831 | * |
| is manager? | -0.12336 | | | | | | -0.0397 | | | | -0.081573 | |
| Pct lines in new files | | | 0.524365 | *** | | | 0.56379 | *** | | | 0.578597 | *** |
| Pct lines for bugs | | | -1.075852 | *** | | | -1.08704 | *** | | | -1.076668 | |
| Pct lines high cyclomatic | | | | | -0.312413 | | 0.14775 | | | | 0.171612 | |
| Pct lines in core | | | | | | | | | -0.417167 | ** | -0.399158 | ** |
| Residual Deviance | 500.67 | | 495.95 | | 500.63 | | 495.81 | | 500.51 | | 495.6 | |
| Degrees of Freedom | 291 | | 291 | | 292 | | 288 | | 292 | | 287 | |
| AIC | 8752.2 | | 8624.5 | | 8749.3 | | 8625.3 | | 8745.8 | | 8619.4 | |
| Theta | 3.521 | | 4.51 | | 3.527 | | 4.557 | | 3.551 | | 4.628 | |
| Std-err | 0.218 | | 0.283 | | 0.219 | | 0.286 | | 0.22 | | 0.29 | |
| 2 x log-lik | -8376.187 | | -8248.529 | | -8375.327 | | -8243.285 | | -8371.818 | | -8235.376 | |
| N = 478 developer/ releases | | | | | | | | | | | | |
| Dummy variables for each of 8 releases omitted. Dummy variables for each of 178 developers omitted. | | | | | | | | | | | | |
| Significance codes: .<0.1, *<0.05, **<0.01, ***<0.001 | | | | | | | | | | | | |

FIG. 16

| Parameter | Model 1: developer attributes | Model 2: developer productivity | Model 3: type of work | Model 4: cyclomatic complexity | Model 5: all controls | Model 6: architectural complexity | Model 7: full |
|---|---|---|---|---|---|---|---|
| Years employed | -0.0535 | | | | -0.0784 | | -0.0786 |
| Is manager? | -0.8123 | | | | -1.0545 | | -1.1398 |
| Lines produced per release | | -0.0002 | | | -0.0002 | | -0.0003 |
| Fraction of lines to fix bugs | | | 1.0526 | | 0.6694 | | 0.0579 |
| Fraction of lines in new files | | | 0.1638 | | -0.6652 | | -1.3219 |
| Fraction lines in high McCabe files | | | | -0.0954 | -0.2562 | | -1.4194 |
| Fraction of lines in core files | | | | | | 3.5440 * | 4.1114 * |
| Residual Deviance | 91.525 | 90.884 | 93.112 | 94.03 | 86.656 | 87.181 | 78.632 |
| Degrees of Freedom | 105 | 106 | 105 | 106 | 101 | 106 | 100 |
| AIC | 97.525 | 94.884 | 99.112 | 98.03 | 100.66 | 91.181 | 94.632 |

Predicting Turnover Among Developers (Logistic Model)

N = 108 software developers

Significance codes: .<0.1, *<0.05, <0.01, *<0.001

FIG. 17

Inputs

Set parameters

*Business outcome metrics (maintainability, agility, and cost) are sensitive to changes in the parameters below, please consider carefully when inserting values other than the defaults.*

| | |
|---|---|
| % code turnover per year | 40% |
| *The feature lines of code (LOC) midified or added in a year divided by the total LOC* | |
| Base LOC for calculations | 1,000 |
| *The base unit to normalize calculations across all systems* | |
| Percentile for comparison | 10% |
| *The top percentile range to compare actual system to* | |
| Programmer yearly salary | $120,000 |
| Programmer hours per year | 2087 |
| Average or expected downstream cost per defective LOC in shipped product | $50.00 |
| Interest rate for technical debt capitalization | 6.5% |

FIG. 18

MAINTAINABILITY ANALYSIS

*Most bugs will be caught and fixed by developers prior to release, which can be very time-consuming*

Given:

| | |
|---|---|
| Total lines of code | 405,579 |
| Code turnover per year | 40% |
| Defect ratio | 16% |
| Bug productivity | 5,125 |
| Feature productivity | 19,706 |

Calculated:

| | |
|---|---|
| Lines of new feature code | 162,232 |
| Lines of bug code introduced | 26,433 |
| Number of FTEs for features | 8.2 |
| Number of FTEs for bug | 5.2 |
| Bug labor (% of total) | 39% |

*Some bugs may be missed by the developers and will emerge in the shipped product*
*There is a downstream cost associated with missed bugs*

Given (or already calculated):

| | |
|---|---|
| Lines of new code | 162,232 |
| Downstream risk | 13% |

Calculated:

| | |
|---|---|
| Lines of bug code shipped | 21,740 |
| Bugs shipped (% of total bugs) | 82% |

FIG. 22

Agility Summary

| System metrics | Metric |
|---|---|
| Days to develop 1000 LOC | 21.5 |
| Feature productivity | 19,706 |
| Bug productivity | 5,125 |

FIG. 25

Agility Analysis - Schedule implications

*The agility of programmers can be measured by the amount of time it takes to develop 1000 lines of code*

*Given (or already calculated):*
| | |
|---|---|
| Lines of new code per year | 162,232 |
| Number of FTEs for bugs | 5.2 |
| Number of FTEs for feature | 8.2 |
| Hours in an FTE year | 2,087 |
| 8 hour days in an FTE year | 261 |

*Calculated:*
| | |
|---|---|
| Days to complete new code | 3,493 |
| Lines of new code per day | 46.4 |
| Minutes per line of new code | 10 |
| Days to code 1000 lines | 22 |
| 40 hr weeks to code 1000 lines | 4.3 |

FIG. 26

Agility Analysis - Waste implications

*The efficiency of programmers con be determined by comparing time to produce 1000 lines of code in this system to 1000 lines of code in on optimal system (top 10%)*

Given

| | |
|---|---|
| Lines to model | 1,000 |
| Percentile for comparison | 10% |
| Days per year | 261 |
| Developer salary | $129,000 |

| *Given* | Actual (current) | Optimal (top 10%)* | Waste |
|---|---|---|---|
| Feature code productivity | 19,706 | 24,238 | 4,532 |
| Buggy code productivity | 5,125 | 6,366 | 1,242 |
| Defect ratio | 16.3% | 5.1% | 11% |
| Days to complete new code | 22 | 13 | 8.1 |

| *Calculated* | Actual (current) | Optimal (top 10%)* | Waste |
|---|---|---|---|
| Number of bugs | 163 | 51 | 111.5 |
| Days on feature | 13 | 11 | 2.5 |
| Days on bugs | 8 | 2 | 2.2 |
| Days per 1000 LOC | 22 | 13 | 8.7 |
| Percent feature time | 61% | 84% | 22.1% |
| Percent bug time | 39% | 16% | 22.1% |
| Time efficiency | 60% | 100% | 40.2% |

*\* Note that this is the optimal top percentile of all benchmarks*

FIG. 29

Cost Analysis & Technical Debt Analysis

*Given (or already calculated) for this system:*

| | |
|---|---|
| Total new LOC / year | 162,232 |
| Bugs shipped (downstream) / year | 21,740 |
| FTEs for features | 8.2 |
| FTEs for bugs | 5.2 |
| Developer salary (annual) | $120,000 |
| Days / year | 261 |
| $ / downstream bug LOC | $50 |
| interest rate for capitalization | 6.5% |

| *Inputs* | Actual (current) | Optimal (top 10%)* |
|---|---|---|
| Days per 1000 feature LOC | 22 | 13 |
| Downstream risk | 13.4% | 3.3% |

| *Outputs* | Actual (current) | Optimal (top 10%)* | Waste |
|---|---|---|---|
| Labor cost | $9,905 | $5,921 | $3,984 |
| Downstream bugs | 134.0 | 33.3 | 100.7 |
| Downstream bug cost | $6,700 | $1,664 | $5,037 |
| Cost per 1000 feature LOC | $16,605 | $7,585 | $9,021 |
| Percent labor cost | 60% | 78% | |
| Percent downstream cost | 40% | 22% | |
| Cost efficiency | 46% | 100% | 54.3% |

*For every $1,000,000 spend, $543,241 is wasted*
* Note that this is the optimal top percentile of all benchmarks

| *We can calculate:* | Total (40% turnover) | Per 1000 lines |
|---|---|---|
| Total FTEs / year | 13.4 | 0.08 |
| Total FTEs / year | $1,606,888 | $9,905 |
| Total downstream risk $ / year | $1,087,023 | $6,700 |
| Total $ / year | $2,693,911 | $16,605 |
| Total technical debt | $41,444,787 | $255,467 |

FIG. 32

| Set parameters | | |
|---|---|---|
| LOC changed per year in entire codebase | 106569 | |
| Average LOC per 'bad bug' | 176 | |
| Developer productivity (for feature development) | 5328 | |
| Developer productivity (for bug-fixing) | 2664 | |
| Avg Number of developers in codebase | 20 | |
| Annual Cost Per Developer (Euros) | €100,000 | |
| Downstream Cost Per Released Bug | € 50,000 | |
| Work Days Per Year | 225 | |
| R - Rate of Return / Opportunity Cost | 10% | |
| T - Number of Time Periods (Years) | 5 | |
| Time to eliminate one McCabe Branch (Days) | 0.1 | |
| Time to cover 1 LOC of uncovered Code (Days) | 0.005 | |
| Cost to Cover 1 LOC | € | 2.22 |
| Cost to Fix One McCabe Branch | € | 44.44 |

| Type of data | Data Source |
|---|---|
| Descriptive data | Version Control |
| Descriptive data | Version Control and Issue Tracking |
| Standard Fitted Output | Productivity Fitted Model |
| Standard Fitted Output | Productivity Fitted Model |
| User input | Team leader labor effort estimate |
| User input | HR labor cost estimate |
| User input | Financial estimate |
| User input | HR estimate |
| User input | CFO rule of thumb for investment decisions |
| User input | CFO rule of thumb for investment decisions |
| User input | Parameter for sensitivity analysis |
| User input | Parameter for sensitivity analysis |
| Calculated value | Fom time and productivity values |
| Calculated value | Fom time and productivity values |

FIG. 36

| Exploring ROI and Rate of return on Hypothetical Quality Improvement Initiatives | | | |
|---|---|---|---|
| Hypothetical Quality Improvement Details | Scenario #1: Baseline | Scenario #2: ACQ Improvement | Scenario #3: ATQ Improvement |
| | No Change to Management Practices | Cyclomatic Complexity driven down to 10 or below | Test coverage increased to 90% or above |
| Quality Improvement Details | | | |
| Numbers of Files that Must be Modified | 0 | 387 | 1473 |
| McCabe Branches Eliminated | 0 | 4164 | N/A |
| LOC that must be covered with new tests | 0 | N/A | 500719 |
| Cost of Quality Improvement | | | |
| Estimate Cost of Quality Improvement | 0 | € 185,067 | €1,112,709 |
| Future Technical Benefit Details | | | |
| Reduction in annual LOC changed to fix bugs | 0 | 8348 | 21197 |
| Reduction in annual LOC changed to fix downstream bugs | 0 | 624 | 0 |
| Person Year Gained | 0 | 3.13 | 7.96 |
| Bad Bug Reduction | 0 | 3.55 | - |
| Future Software Economics Benefit Details | | | |
| Annual Money Saved From Lower Bug Fix Activity | 0 | € 313,334 | € 795,616 |
| Annual Money Saved From Fewer Bad Bugs | 0 | € 177,450 | € - |
| Annual Total Money Saved | 0 | € 490,784 | € 795,616 |
| Benefit of Quality Improvement (Present Value) | | | |
| Present Value of Money Saved from Quality Improvement | 0 | €1,860,456 | €3,016,009 |
| Is it Worth It? | | | |
| Investment ROI - Lower Bound | 0 | 453% | 49% |
| Investment ROI - Expectation | 0 | 905% | 171% |
| Investment ROI - Upper Bound | 0 | 1559% | 347% |
| Years to breakeven point - Lower Bound | 0 | 0.75 | 2.80 |
| Years to breakeven point - Expectation | 0 | 0.38 | 1.40 |
| Years to breakeven point - Upper Bound | 0 | 0.25 | 0.93 |

FIG. 37

COMPUTER-IMPLEMENTED METHODS AND SYSTEMS FOR MEASURING, ESTIMATING, AND MANAGING ECONOMIC OUTCOMES AND TECHNICAL DEBT IN SOFTWARE SYSTEMS AND PROJECTS

CROSS REFERENCE TO RELATED APPLICATION

This application claims priority from U.S. Provisional Patent Application No. 62/296,376 filed on Feb. 17, 2016 entitled TOOLS AND METHODS FOR MEASURING, ESTIMATING, AND MANAGING BUSINESS OUTCOMES AND TECHNICAL DEBT IN SOFTWARE SYSTEMS AND PROJECTS, which is hereby incorporated by reference.

BACKGROUND

The present application generally relates to methods and systems for analysis of software codebases and, more particularly, to an interrelated set of tools and methods for (1) measuring the relationship between software source code attributes (such as code quality, design quality, test quality, and complexity metrics) and software economics/business outcome metrics (such as maintainability, agility, and cost) experienced by development and maintenance organizations, (2) using this information to project or estimate the level of technical debt in a software codebase, (3) using this information to estimate the financial value of efforts focused on improving the codebase (such as rewriting or refactoring), and (4) using this information to help manage a software development effort over its lifetime so as to improve software economics, business outcomes, and technical debt while doing so.

BRIEF SUMMARY OF THE DISCLOSURE

A computer-implemented method in accordance with one or more embodiments is provided for analyzing a computer software codebase. The method comprises the steps performed by one or more computer systems of: (a) generating software economic output metrics for the software codebase using one or more fitted statistical models, said software economic output metrics including defect density projections and/or developer productivity projections for the codebase; (b) exploring the impact of a code quality improvement initiative, a design quality improvement initiative, or a test quality improvement initiative by adjusting code quality inputs, design quality inputs, or test quality inputs to the one or more fitted statistical models to generate updated software economic output metrics including updated defect density projections and/or updated developer productivity projections for the codebase; (c) computing costs associated with the defect density projections and/or developer productivity projections determined in (a) and costs associated with the updated defect density projections and/or updated developer productivity projections determined and (b); (d) analyzing the costs computed in (c) and outputting results thereof.

A computer-implemented method in accordance with one or more embodiments is provided for determining the technical debt of a computer software codebase. The method comprises the steps performed by one or more computer systems of: (a) generating software economic output metrics for the software codebase using one or more fitted statistical models, said software economic output metrics including defect density projections and/or developer productivity projections for the codebase over a period of time the codebase is expected to be in service; (b) calculating a total cost of development including costs associated with fixing defects and developing new features based on the defect density projections and/or developer productivity projections over the period of time; (c) calculating a capitalized value of the costs calculated in (b) based on a given interest rate to determine the technical debt of the codebase; and (d) outputting the technical debt.

A computer-implemented method in accordance with one or more embodiments is provided for analyzing a computer software codebase. The method comprises the steps performed by one or more computer systems of: (a) generating first level software economic output metrics for the software codebase using one or more fitted statistical models, said first level software economic output metrics including at least one of: defect density or developer productivity projections for the codebase; (b) receiving additional information including at least one of: benchmark data collected from analysis of other codebases, information related to version control or change management systems, and user input parameters; and (c) using the first level software economic output metrics generated in (a) and the additional information received in (b) to generate second level software economic output metrics including at least one of: metrics related to maintainability, agility, cost, risk, defects, waste, security, technical debt, and schedule, and outputting the second level software economic output metrics.

A computer-implemented method in accordance with one or more embodiments is provided for analyzing a computer software codebase. The method comprises the steps performed by one or more computer systems of: (a) storing one or more custom fitted statistical models in a data store, each custom fitted statistical model calibrated for a different single codebase and created by applying statistical regression techniques to code quality metrics, design quality metrics, and/or test quality metrics independent variables and software economic outcome dependent variables for a codebase; (b) retrieving said one or more custom fitted statistical models from the data store and using said one or more custom fitted statistical models to generate a standard fitted statistical model for another codebase, and storing the standard fitted statistical model in a data store; and (c) retrieving said standard fitted statistical model from the data store and using said standard fitted statistical model to make defect density or developer productivity projections for said another codebase, and outputting the defect density or developer productivity projections.

BRIEF DESCRIPTION OF THE DRAWINGS

FIG. 8 is a table of exemplary file-level descriptive statistics.

FIG. 9 shows tables of exemplary system-level descriptive statistics, using core-periphery (top) and cyclomatic complexity (bottom) paradigms.

FIG. 10 is a table of exemplary system-level descriptive statistics for multiple snapshots of the same system.

FIG. 11 is a table showing exemplary measures of development activity during different releases.

FIG. 12 is a table showing exemplary system-level descriptive statistics for multiple snapshots of the same system.

FIG. 15 is statistical table showing an example of a significant relationship between both cyclomatic complexity and architectural complexity and defects in a file.

FIG. 16 is a statistical table showing an example of a significant relationship between both architectural complexity of the files developers work in and their productivity.

FIG. 17 is an exemplary table showing turnover predictions amongst developers.

FIG. 18 is a screenshot showing an exemplary input GUI panel for tool allowing exploration of CQ, DQ, TQ, and SE. Users can enter information about a development project for use in software economic calculations.

FIG. 22 is a graph illustrating details of exemplary maintainability calculations.

FIG. 25 is an exemplary agility summary screenshot from a tool.

FIG. 26 shows exemplary schedule implications details in a tool GUI.

FIG. 29 shows a detailed analysis of exemplary waste implications in tool GUI.

FIG. 32 shows a detailed exemplary cost analysis in tool GUI.

FIG. 36 is a table showing exemplary assumptions and client-provided data enabling hypothetical decision valuation.

FIG. 37 illustrates an exemplary screen from a software investment tool showing comparison of two hypothetical improvement scenarios.

DETAILED DESCRIPTION

Section 1: Overview

Figure 1B:
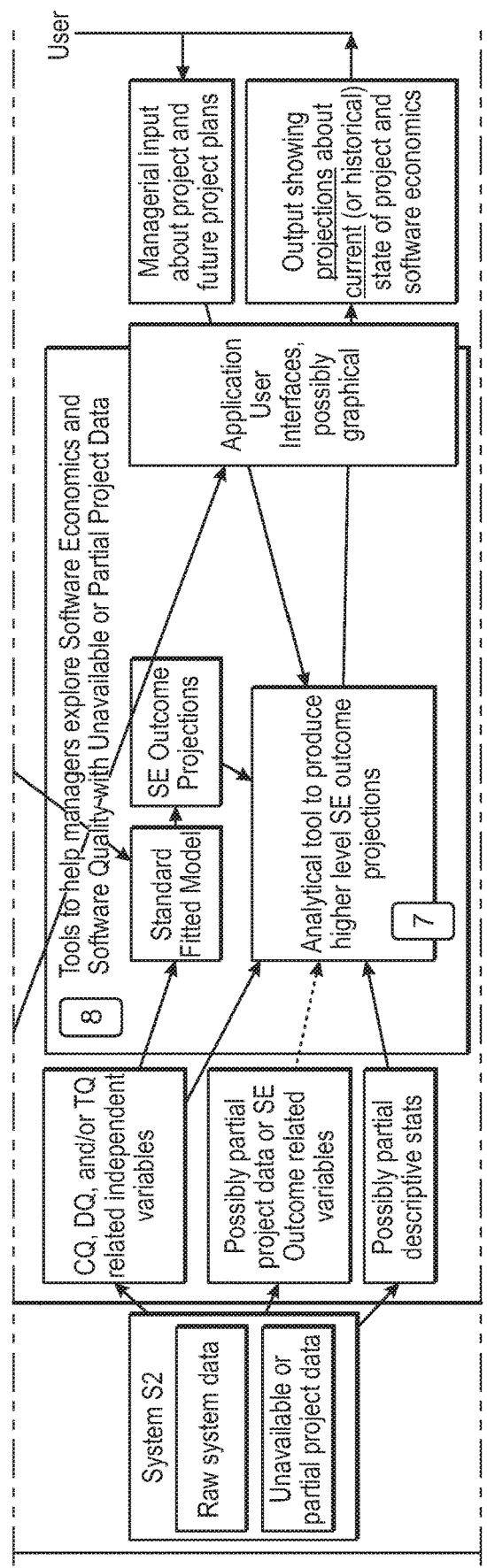
FIG. 1 is a simplified block diagram illustrating the overall structure of a software analysis system in accordance with one or more embodiments.

Various embodiments disclosed herein relate to an interrelated set of tools, technologies, and processes that can be used, e.g., by leaders in a software development organization or in an organization that contracts for software development to manage in a better-informed and more financially rational way. These tools help them better assess individual software systems/projects and portfolios of those systems/projects. The tools can also be used by those responsible for independent verification and validation (IV&V) and those doing "due diligence" during the acquisition of a software system or development organization to assess future software economics, operational performance, and financial performance.

Tools described in accordance with various embodiments allow managers to make better decisions by helping them clearly and quantifiably understand the link between codebase quality and its impact on the business. A fundamental idea behind these tools is that the quality of an existing software codebase is a key driver of software economic outcomes experienced by those doing further development of a system. Quality in a software codebase affects how well engineers understand their code, how effectively teams can communicate about it, and how adaptable the system is to future change. For these reasons, quality strongly impacts a system's maintainability, agility, and cost. Quality in a codebase is a multifaceted concept. Three important facets of quality include code quality (CQ), design quality (DQ), and test quality (TQ). Code quality relates to how well individual parts (such as files or functions) within the system are constructed. Design quality relates to how well they are assembled architecturally, or whether important things (such as modularity) have degraded. Test quality relates to the suitability of unit and system tests to exercise the system and prevent errors and regressions. Metrics related to CQ, DQ, and TQ are often captured and computed by tools that examine product code and exercise test suites. Software economic (SE) outcomes (or business outcomes) experienced by development organizations relate to the speed and cost of adding useful features, the ability to meet schedules, the productivity of developers when adding functionality or removing bugs, the fraction of time wasted fixing bugs, the cost and risk of quality or security problems, and the agility with which the organization can adapt to changing customer needs or market conditions.

Various embodiments described herein include tools and methods with many purposes including, but are not limited to the following:

(1) Measuring the relationship between software attributes (such as CQ, DQ, TQ metrics) and SE outcomes experienced by organizations developing or maintaining that code.

(2) Benchmarking CQ, DQ, TQ across software systems.

(3) Making quantitative financial estimates of the maintainability, agility, and cost of further development in an existing software source-codebase.

(4) Better evaluating the performance of a development or maintenance team working within a legacy system.

(5) Better assessing the risk associated with adopting, purchasing, or making oneself reliant upon a software system.

(6) Better assessing the work done by a contractor or other third party.

(7) Better assessing the financial value of a software asset or a software development organization.

(8) Improving detailed planning and budgeting by constructing more realistic estimates of the cost of future work in an existing codebase.

(9) Estimating or measure the 'technical debt' in a codebase in a manner that is analogous to the concept of 'financial debt'.

(10) Helping executives decide whether to fund the refactoring or rewriting of a software system by estimating the financial ROI of such an effort.

(11) Steering a development effort to better reduce risk, improve financial & operational outcomes, and extend its lifetime.

(12) Helping managers more wisely choose whether and how much to invest in CQ, DQ, or TQ improvement initiatives of various kinds.

(13) Helping product developers make a financial business case for CQ, DQ, or TQ improvement.

The interrelated processes, tools, and technologies described herein in accordance with various embodiments are useful both in combination and individually for more targeted or more general purposes.

Figure 1C:
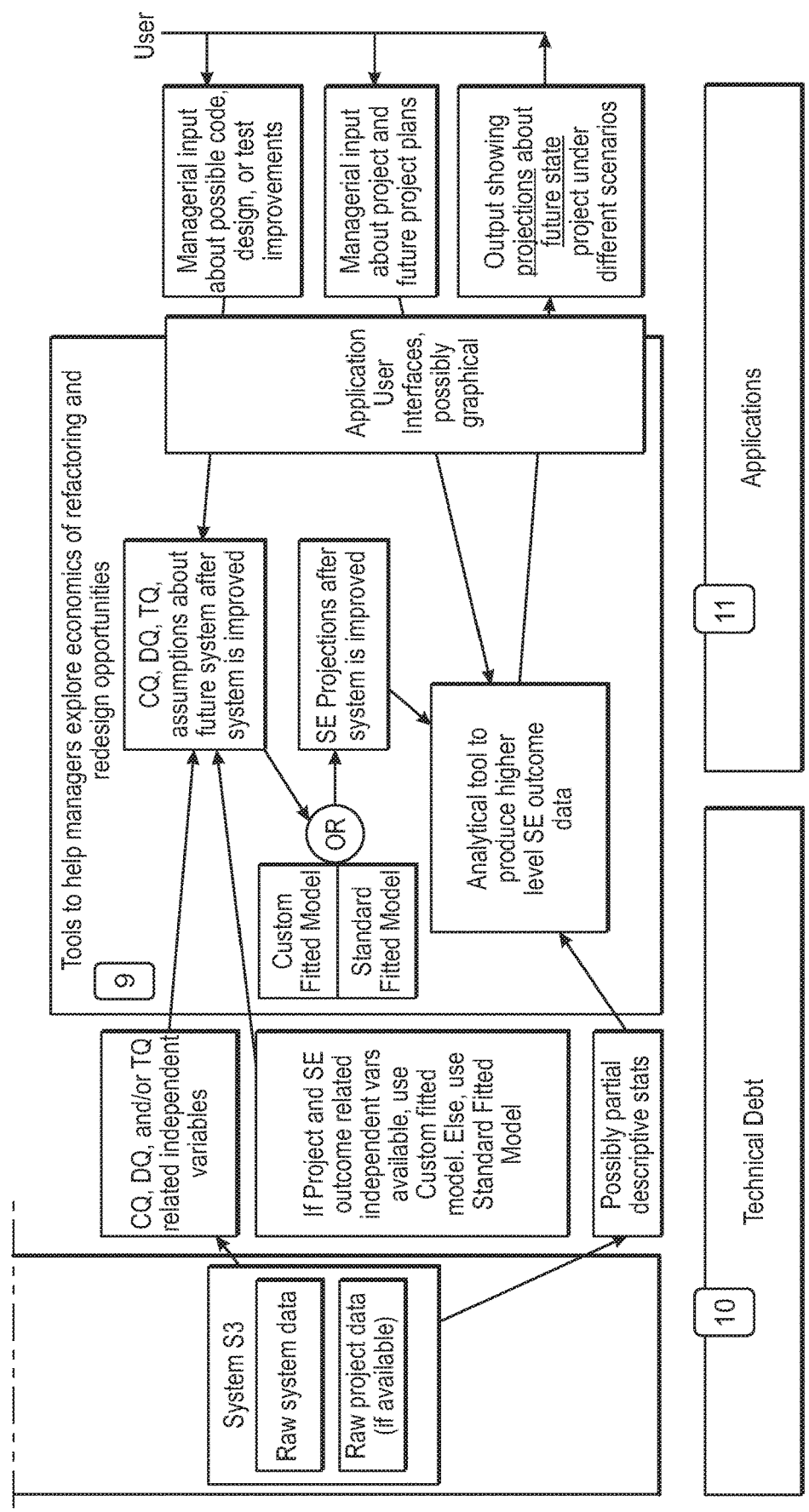

For illustrative purposes, the detailed description herein is broken into the following interrelated parts shown in FIG. 1. In the diagram, the numbers 2-9 correspond to section numbers in the specification.

Section 2: Tool for capturing and linking software codebase, project, and software economic information—Captures, links, stores, and presents information about a software codebase, software project management information related to its development, software code changes, software development organization information, information gathered from the codebase's build, test, and continuous integration environments, information from software analysis tools, and other information that can be gathered about the technical artifact, its software management process, and financial, operational, and business outcomes experienced by the development organization as they co-evolve.

Section 3: A 'Zoo' containing information about many systems—A system for managing the capture, linking, storage, and presentation of information about many codebases, development projects, and outcomes, as well as a data-store containing this information.

Section 4: CQ, DQ, TQ, & SE benchmarks and descriptive statistics—Tools and processes for computing and presenting CQ, DQ, TQ, and other metrics from raw data in the Zoo. Enables comparison and benchmarking within and across codebases and development efforts.

Section 5: Tools to create 'custom fitted models' linking CQ, DQ, TQ and resulting SE metrics—Statistical and other computational models can embody theories about the relationships between CQ, DQ, and TQ metrics and the impact they have during future development or maintenance as captured by SE outcome metrics. A model-fitting regression can be run on quality data and SE data captured from a single software codebase and development project. This results in a 'custom fitted model' with symbols and definitions calibrated for that project. Custom fitted models can provide estimates for low-level (or first level) SE parameters such as 'defect ratio' (the ratio of lines modified to fix bugs vs. implement features) or 'developer productivity' (lines of code produced per developer per year). Many such 'low level' metrics can be estimated or projected from 'custom fitted models'. This tool can also create 'custom fitted models' for multiple projects and store those models in appropriate data stores.

Section 6: Tools to create 'standard fitted models' linking CQ, DQ, TQ and resulting SE metrics—Multiple 'custom fitted models' capturing information about quality and SE from different contexts can be combined to create a 'standard fitted models.' By merging multiple 'custom' models and adding over time, the 'standard fitted model' gains in applicability and predictive power. These standard models can be used to generate SE projections in situations where code is available, but project information is incomplete or missing. CQ, DQ, or TQ values can be captured from a codebase. This information can be fed into 'standard fitted models' to make projections about SE outcomes that should be experienced by the organization developing or maintaining the codebase.

Section 7: Analytic tool for producing higher-level SE metrics—Fitted models produce low-level SE metrics, which are often associated with independent variables from regression models or closely related metrics. This tool ingests low level estimates and projections generated by fitted models to produce and present higher level (second level) SE metrics for use in managerial decision-making. Examples include things such as 'days required to develop and debug a 1000 LOC feature.' These higher-level SE metrics may also include user-input in their formulation. Derived SE values provide meaningful insights to software leaders.

Section 8: Tool to help managers explore software economics and software quality on a project where project data may be unavailable or incomplete—Tools that help software leaders understand their current situation make use of quality and SE benchmarks from a Zoo, custom fitted models constructed from project data, and analytics for giving strategic insight into the relationship between CQ, DQ, TQ, and SE can help managers make better strategic decisions. These tools can help software leaders understand their current situation even when sources of SE outcome data (such as version control or issue tracking systems) are missing. When low-level SE data is missing, tools make use of quality and SE benchmarks from a Zoo, standard fitted models constructed from other data-sets to give SE projections for a current system, and further analytics for giving strategic insight into the possible relationship between CQ, DQ, TQ, and SE.

Section 9: Tool to help managers explore the economics of refactoring, rewrite, or quality improvement opportunities—Software leaders deciding whether to refactor or rewrite a system need the ability to compare the cost of a rewrite or refactoring effort against the likely benefits in terms of improved project SE after quality is improved. Custom fitted models created from existing project data or the standard fitted model can be applied to estimate future SE outcomes in a 'business as usual' case. Goals for CQ, DQ, or TQ improvement achieved via refactoring or rewriting can then be fed into these models to project the achievable SE in the case where improvement takes place. Financial modeling can help leaders make estimates of the value of the intervention by projecting parameters such as the ROI or break-even point of an investment in quality improvement.

Section 10: Applications of business outcome methods and metrics—This section highlights a few examples to illustrate the use and value of the novel tools and techniques described in this document.

Section 2: Tool for Capturing and Linking Software Codebase, Project, and Business Outcome Information This section describes an exemplary process for capturing information from a software codebase, capturing information about the development process from version control, issue tracking systems, and other management systems, and inserting that information into a data store for further use.

Figure 2:
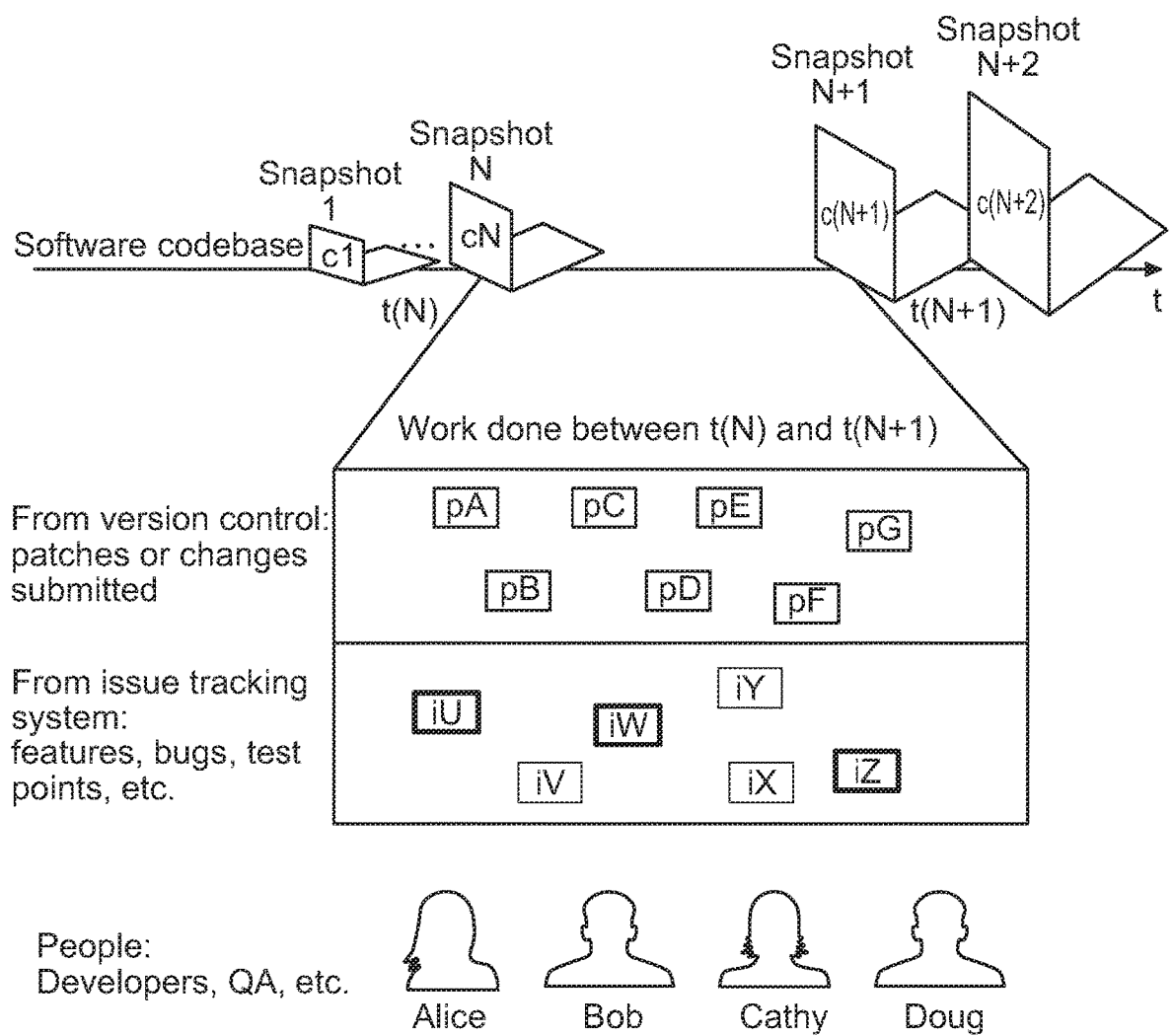
FIG. 2 illustrates an exemplary software development timeline.

A single codebase can be scanned using tools (such as static analysis tools) to capture information about its structure, properties, and metrics at a single point in time. As illustrated in FIG. 2, the same codebase can be scanned at multiple points during its evolution to enable comparison and trending. Each of these snapshots of the codebase may also be linked with its contemporaneous change request and version control data (as explained in the next section) to add more depth and data necessary for understanding the development process and evolution as well as code structure. This process can also be repeated for many heterogeneous systems, allowing comparisons to be made between different codebases in the same project or portfolio, or between entirely unrelated codebases and portfolios as part of a large-scale benchmarking system.

2.1 Background on Developer Workflow in a Complex Project

The following describes some features of the workflow of a software developer for a large and/or long-running project and the tools and databases used in the development process to assist in the understanding of which data to capture from each system, how to link it, and how it might be used.

Figure 3:
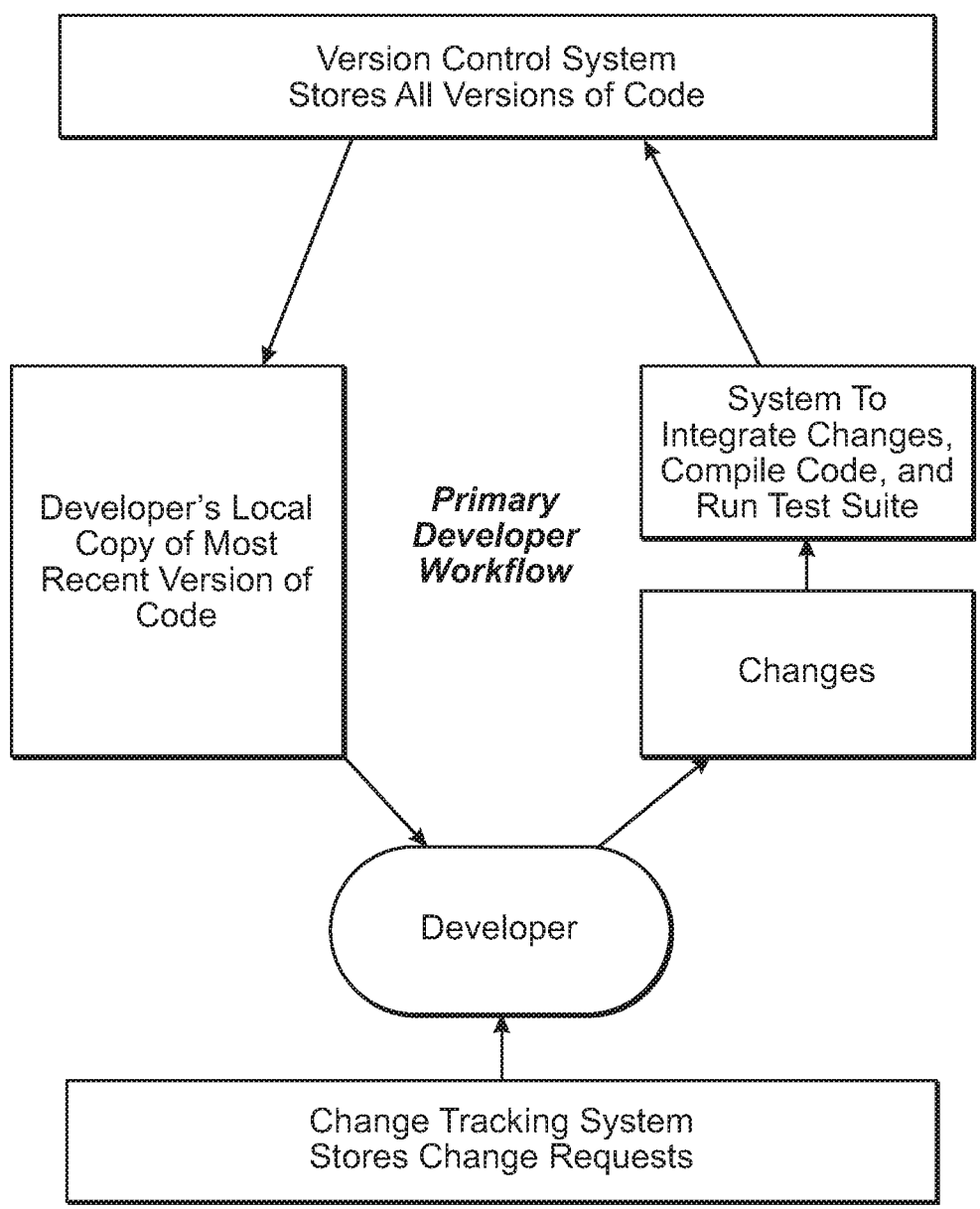
FIG. 3 illustrates an exemplary developer workflow.

In one common software development workflow as illustrated in FIG. 3, a software engineer will interact with both a change request system and a version control system. A change request system (also known as an issue tracking system) often stores feature requests and bug reports or 'tickets'. It is used by developers to manage tasks and to track work progress. A version control system (also known as a source code management system) stores all versions of the source code and information about the changes that go into it over time. It allows developers to look at the history and evolution of every file it manages and determine who contributed each line of code. Widely used examples of change request systems include JIRA and Bugzilla, while widely used examples of version control systems include Git and Subversion.

As an illustrative example, imagine that a developer named "Jill" has undertaken the task of making a change to the software. Jill chooses a task to work on from a list of tasks in the change request system. (If the task she wishes to work on is not in the system, she creates a new entry.) She engages in planning activities appropriate to the task such as requirements gathering, functional design, architectural design, and communication with other people and teams. When Jill is ready to begin coding, she creates a copy of the most recent version of the code from the version control system's central repository. She makes a local copy, sometimes known as a "sandbox," that she is free to modify, recompile, and test without interfering with the work of others. Jill implements the required changes by modifying existing source code files or creating new ones.

When Jill believes the task is complete, she submits her new and modified files to the version control system for inclusion in a new "most recent" version of the code. The version control system compares Jill's locally modified files against the current version and does two things: (1) creates changes which store information about specific lines that must be added to and removed from each modified file to incrementally update it from one version to the next; and (2) inserts those changes into the version control system repository so that the next person to create a sandbox will obtain Jill's new version of the code.

Once this process is complete, Jill will modify the change request in the issue tracking system to indicate that the work has been completed and will begin the process anew on her next task.

Figure 4:
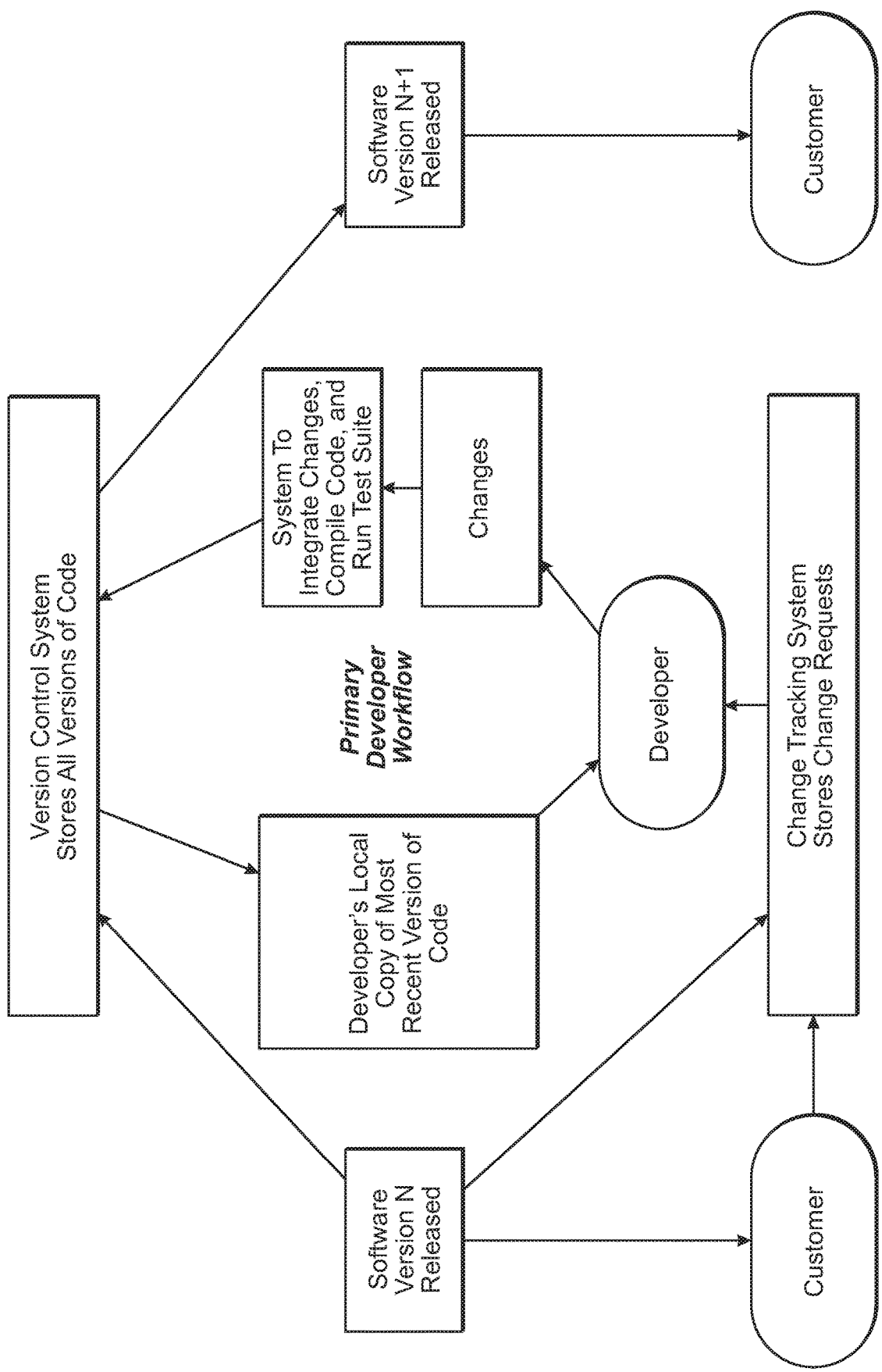
FIG. 4 illustrates an exemplary developer workflow and release cycle.

FIG. 4 shows the workflow from above in the context of software releases and customer interactions. Customers receiving a new version of software (shown in the lower left) often have unmet needs, encounter limitations, or discover defects in the product. Through various planning processes, marketing activities, and technical support channels, customer needs are translated into prioritized feature requests and bug reports, which are stored and tracked in the change tracking system. Requests are also entered by employees who need to track their own work, encounter bugs, or need functionality developed by other teams. They enter information about features they wish to develop, bugs they need to fix, and refactoring that should be done. (Refactoring is the process of restructuring code architecture to improve code quality by relocating, consolidating, and otherwise modifying functions and files in a systematic manner.)

Developers and managers use the change tracking system to monitor the progress of their work. Change requests are assigned owners and passed between people. They contain information about whether a request is to correct a bug, implement a feature, or do some other task such as refactoring. Each change request can put into a number of states indicating development progress beginning with "New" and ending as either "Completed" or "Discarded."

Note that these example workflows are not definitive descriptions of how organizations conduct their development process and use project management systems. Every organization is different, and aspects of these processes may be adjusted depending on organizational needs. The tool uses project management data in service of calculating business outcomes, and the windows of time under scrutiny may or may not align with software release windows, depending on organizational protocol.

2.2 Data Store Linking Information from Software, Software Development, Software Project Tracking, HR, Etc. For Analysis Source code, tools to extract code metrics, version control, and issue tracking systems all contain useful data in separate heterogeneous data stores that are often not linked. This data is useful for various purposes. When aggregated and linked, we can derive additional value. The first step in the process of analyzing a codebase and its attendant project management data is to establish, index, link, and (in some cases) collect some of the contents of these various data sources into an aggregated data store or 'Zoo'. This involves organizing a number of data sources containing different types of information and directing various tools to form input/output pathways between them. Once the data has been collected or indexed, it can be further analyzed to produce low-level CQ, DQ, TQ, and SE outcome parameters. These parameters can be used as independent and dependent variables to specify statistical models and create fitted models. Projection techniques can be used to fill data gaps. Specifications for the types of data required for such analysis are given in this section.

Figure 5:
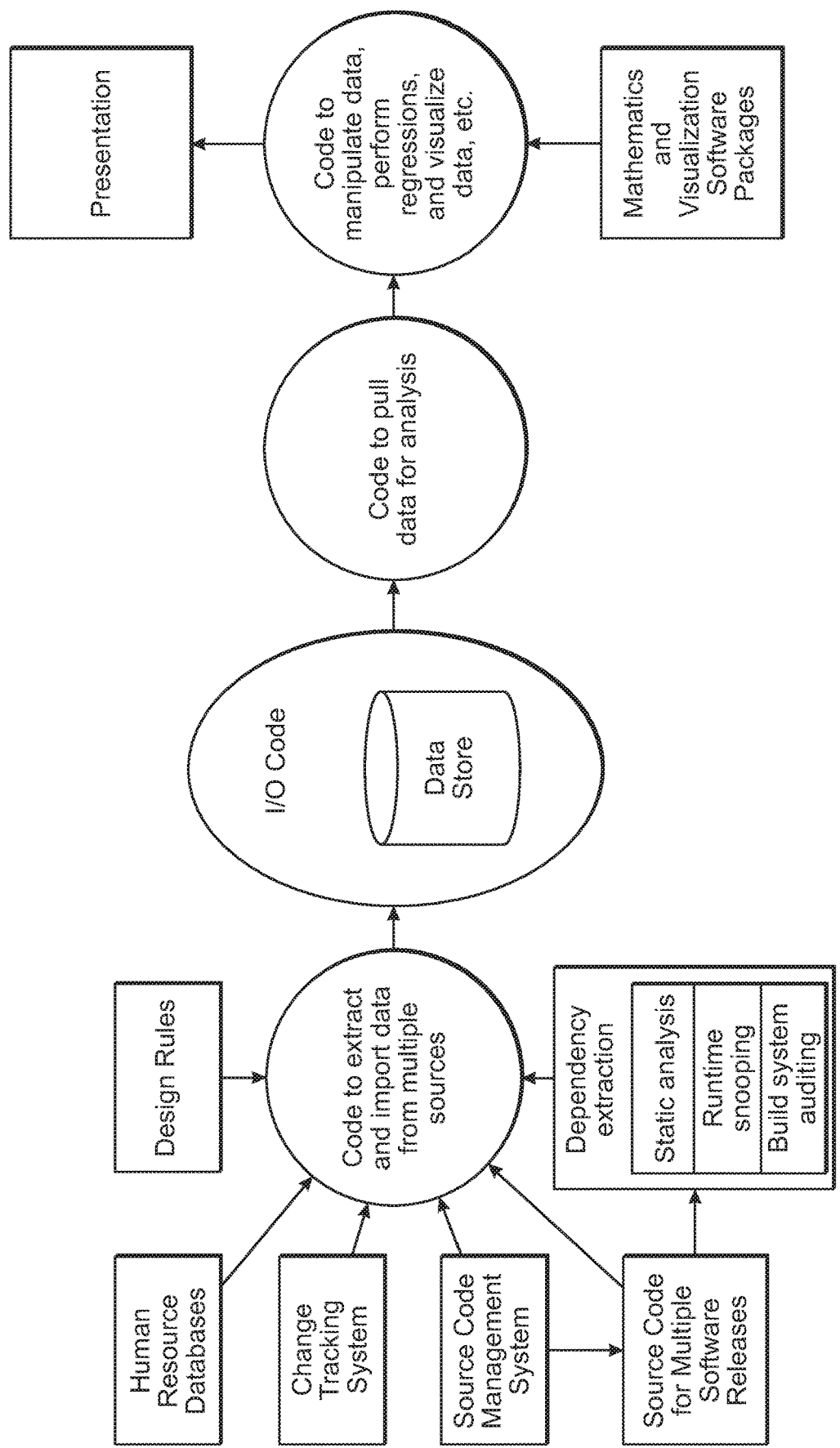
FIG. 5 illustrates a simplified software analysis tool structure.

FIG. 5 depicts a simplified version of an exemplary tool's structure. The first layer of tool code extracts and gathers code data, project management data (version control, issue tracking, human resources, etc.), and any other relevant contextual data sources. Successive coding elements then organize this data into an appropriate data store (possibly a relational database) and construct relevant data tabulations from it. Finally, the tool performs various types of statistical analysis to determine various file-by-file metrics, which can ultimately be aggregated and visualized in a number of ways.

2.2.1 Inputs and Data Store Structure

Data used for such analysis is the source code itself, which will come in the form of at least one snapshot at a particular point in time, possibly with additional snapshots over time for comparison purposes. For some systems inserted into this data store, only code will be available. A variety of tools can be used to run analysis (such as static analysis) on the snapshot(s) to capture metrics, identify issues, extract the code's dependency structure. Given only the code (and possibly also the ability to run or execute automated test scripts) the following types tools might be used to capture useful information from each snapshot.

(1) Static code analysis can be used to analyze code to collect metrics, identify problems, identify violations of coding standards, and extract dependency information for use in network graphs, dependency structure matrix analysis, and other architectural analysis.

(2) Code compiling may also produce useful results in terms of warnings or other notifications from the compiler.

(3) Dynamic code analysis can be used to extract runtime behavior, discover how often code paths are used, identify dead code, and find other useful information about the code and the system.

(4) Code testing can be done to measure the level of test coverage for different parts of the system and measure the frequency of regression test failures in different parts of the system.

(5) Automated defect-finding tools may be used in tandem with issue tracking data to get a more complete picture of defect proportions in the codebase.

The above list of processing methods is meant to be exemplary rather than exclusive, and other methods may be used to gain more data and further refine the tool's statistical models.

Comparing data between snapshots reveals changes in the code and other development activity over time, such as the fluctuations in various defect metrics, or between diffs (line-by-line version control lists of differences between any two snapshots). Code can be moved to new locations between snapshots: a file can change names or move to a different directory or component, or entire entities can be moved to different locations in the codebase. Taking steps to account for these possibilities can mitigate the potential for unwanted discrepancies in code measurement.

In some instances, project management data that may also be available for capture and analysis. This includes data from version control, issue tracking, and human resource tracking systems, which serve to improve the tool's understanding of various features of developer activity, defects, code change over time, and other elements of the development process. If information about patches (or changes) from a version control system is added to the data store, one can extract information about which lines of code were changed in each file by which developer on what date. This information can be used to determine how much development activity or change is occurring in different parts of the system. When combined with code metrics, one potential benefit is that analysis might be done to determine if more complex or less complex parts of the code are under active development, for instance.

Similarly, information about tickets in the issue tracking system can be added as well. This data may contain information about each task including (1) whether it is a bug being fixed, a new feature, or some other task, (2) information about severity level, criticality, or priority, (3) information about when the bug was found, how long it has been opened, and when fixed, (4) information about when features were requested and when implemented, and (5) information about which developer(s) did the work.

Other contextual information may be captured as well. Release planning information (such as dates for the project's start, code freeze, release, etc.) can aid in accounting for changes over time in version control information and/or successive code snapshots. Data indicating which files belong to each subsystem, system, layer, component, or product (examples) can be included as well to add utility to analysis and reporting. Additionally, having access to the code's build & test suite will allow the tool to factor the results of the build & test phase into its analysis, in order to understand code structure and failure points.

Figure 6A:
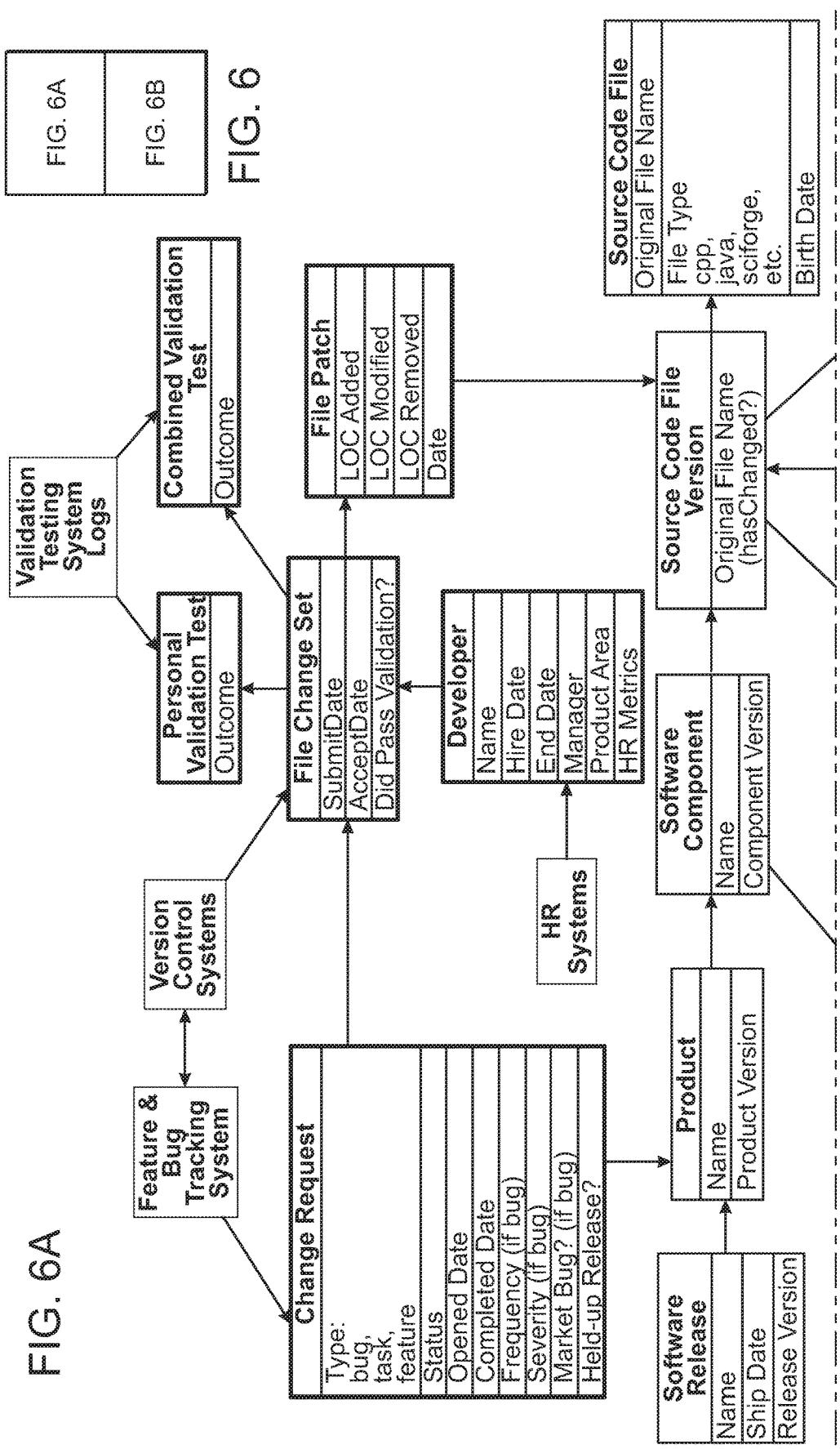
FIG. 6 illustrates an exemplary data store structure.
Figure 6B:
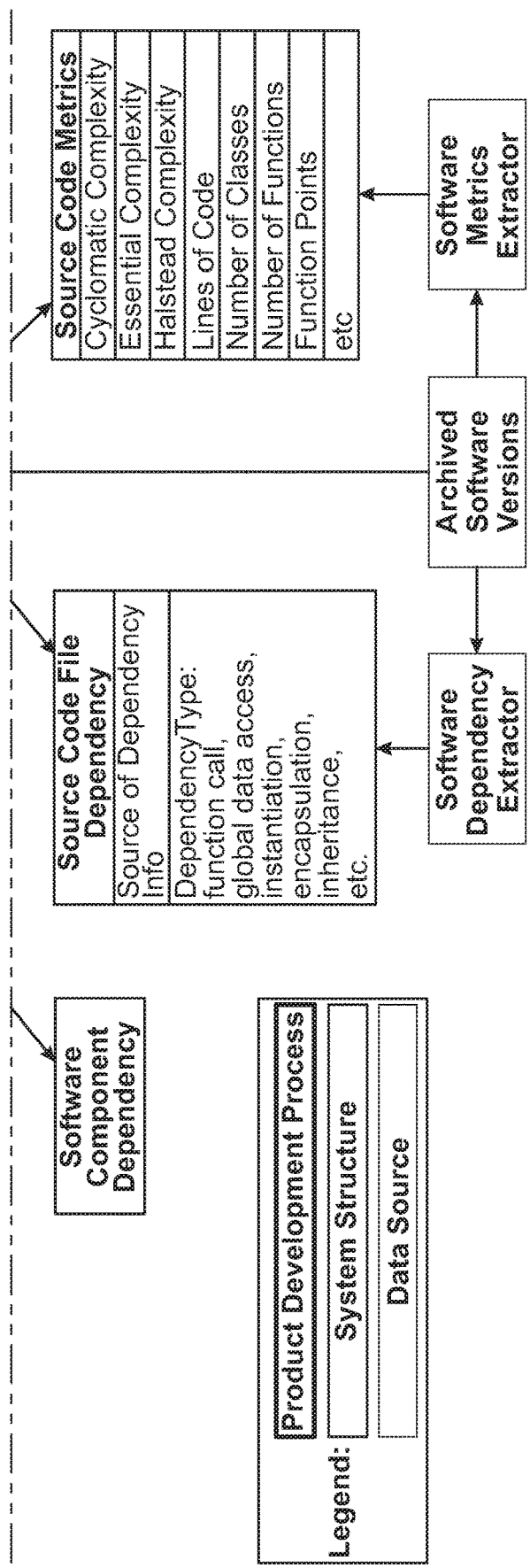

FIG. 6 shows examples of the types of data that may be captured in a data store, and how the data is linked. The precise structure of the data store used to house such information may vary according to the needs of a particular project, but each entry in the data store (whether from version control, issue tracking, testing, extracted metrics, etc.) is linked to a particular project snapshot. All snapshots of that project, in turn, are linked together under that snapshot's heading in a time series over its lifecycle.

In some development environments, data is available on the relationship between software patches stored in the version control system and tickets managed in the issue tracking system. In these situations, tools will be configured to capture information about which coding task is related to which changes being submitted by a developer. In other situations, development processes may require that this information to be entered by developers despite a lack of tool integration. For instance, management may demand that developers enter a 'ticket id' into the comments associated with each patch that goes into the version control system.

Figure 7:
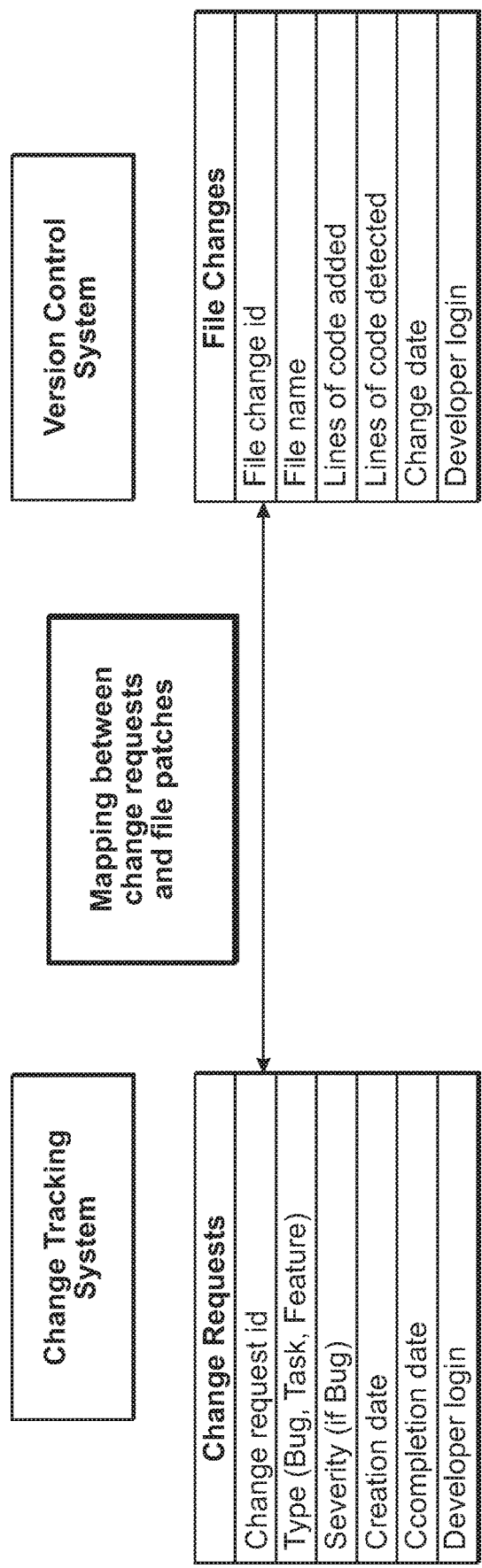
FIG. 7 illustrates linked version control and issue tracking data.

FIG. 7 depicts an exemplary mapping between issue tracking and version control that can be done in the data store in these instances so that particular feature implementations or bug fixes can be linked with the files in which they take place. When this high-quality data is available, it can be used for many purposes such as to calculate the overall prevalence of defects in individual files, or in different sections of the code.

Developer-specific activity can also be tracked by means of project management data, permitting, e.g., the determination of whether a developer becomes less productive when moved to a more a difficult section of code by controlling for experience, role changes, and managerial status.

Finally, a project may be considered as a whole, in order to determine trends over time between many code snapshots, and overall quality metrics for the entire project can be calculated. Characteristics of full projects can also be compared with others managed by the same team, department, or company in order to obtain a higher-level view, or with the much larger set of projects in the "Zoo" for benchmarking and projection purposes (see Section 2).

2.3 Capture Process

A capture program extracts data from heterogeneous sources and inserts information into the data store. The sources include project management data and the outputs of third-party tools that have been used to analyze the codebase (including build & test code) and extract both simple metrics (filenames, filepaths, lines of code, etc.) and more complex metrics (architectural & complexity features, etc.). The program places information into the data store in such a way that it is appropriately segmented into the different data types, as well as appropriately linked to other relevant data segments.

2.4 Data Cleaning and Tagging

In an optional data cleaning step, the tool can automatically tag certain types of code that it is able to recognize due to distinctive features, such as test code, machine-generated code, or third party, or open-source code allowing it to be excluded or treated separately during analysis. It also allows manual tagging, if the user wishes to track certain types of files by tagging them at point of capture. Metadata may be supplied to with a codebase so that these features can be automatically identified correctly. Alternatively, heuristic rules could be devised to attempt identification, perhaps imperfectly. Data cleaning can also be done to identify and tag other issues, such as excessively large version control patches that might indicate code being moved between files rather than code developed immediately prior to the patch. This can be used as a filter when using version control data to estimate the amount of development activity occurring in a time-period.

2.5 Data Presentation

Once the data has all been correctly cleaned, organized, and linked in the data store, it can be accessed and presented in different forms depending on the nature of the project and the user's requirements. These access methods can range from command-line interfaces or web APIs to simpler methods like exporting data to programs such as Microsoft Excel or Tableau, or serving it through a web-based presentation. This range of possibilities allows for tailoring the level of customizability versus legibility: the more technical options may be preferable for users who wish to use the data for supplemental calculations, while the more user-friendly options may be better for clear and immediate understanding of complex data through means of charts & graphs, color-coded quality indicators, and other design elements.

2.6 Types of Data Captured and Linked

The type and quality of data available, as well as its intended use, will determine what is captured and linked in a data store. Below are examples of some of the different types of data that may be available and captured for a given system:

(1) Code only: This is the bare minimum that the tool will accept.

(2) Multiple versions of code: Deltas between multiple versions can be used to show trends and identify overall activity levels in a coarse way.

(3) Code+version control: The codebase is accompanied by a version control system, allowing individual line-by-line file modifications to be tracked by date & time, size, user ID, and so on.

(4) Code+version control+issue tracking: The codebase is now also accompanied by an issue tracking system, allowing bug reports and feature requests to be tracked by opening & closing date & time, opening & closing user IDs, type, criticality, priority, and so on.

(5) Code+linked version control+issue tracking: Same as previous, except that version control and issue tracking systems have linkages between them allowing bugs to be located in specific files, providing a major boost to analytical ability.

(6) Continuous integration+testing info: Information about build failures, compiler warnings, unit+system test failures, and test coverage can be captured.

(7) Release planning info: A list of scheduled release dates allows the tool to determine how frequently the project missed its intended releases, and by how long.

(8) Human resources metadata: Developer information including work-hours, salary (and other employee expenses), level of experience, and identifiers allowing individuals to be linked to version control and issue tracking data.

(9) Outcome data: Historical data regarding development cost, how much development labor was applied, how much time was spent fixing bugs, whether the project failed, etc.

Section 3: A 'Zoo' Containing Information about Many Systems 3.1 Collection of Codebases and Project Data By pulling data from each system that is analyzed and storing it in a large collection, herein called the "Zoo," it is possible to gain various kinds of comparative insight into the nature of large software systems, as well as to improve the quality of analysis for any single system.

3.2 Zoo Management

As is the case with the data store, the Zoo may be structured in a number of different ways depending on project needs. Its functions include creating a new system entry, adding data to the entry, updating that data, searching the Zoo for relevant data, and extracting it on either a case-by-case or recurring basis.

3.2.1 System for Creating and Adding to Zoo

Systems may be added to the Zoo via an incremental capture model, in which data from new versions of a codebase is added incrementally along with new information about the development process. There are multiple methods for implementing this, including: a push model, in which the system periodically sends an update to the Zoo; a pull model, in which the Zoo periodically sends an information request to its data sources; and a continuous integration model, in which the system owner manages development and integration using a tool such as Jenkins, which then triggers Zoo updates. If desired, the Zoo manager (the person in charge of the tool's global Zoo, or a designated person from an organization who is responsible for a local Zoo) can set the tool to pull statistics on these information exchanges back to a central repository for further analysis.

3.2.2 System for Collecting Information from Zoo

The Zoo manager may collect high-level information from across the entire Zoo by submitting a Zoo-wide query. The results of this query can include information such as the number of projects, the total number and per-project average number of snapshots, a breakdown of project languages by percentage, an ordered list (or a subset of that list, such as the top decile) of all the Zoo systems ranked by a particular parameter, and so on.

3.2.3 System for Running Jobs to Extract Information from Zoo

By contrast, when information is desired on specific subsets of the Zoo, smaller jobs may be run to isolate subsets according to specifications and then extract the required data from them.

There are multiple potential ways to select different subsets of the Zoo. First, a subset of snapshots may be selected based on characteristics, such as all snapshots of code in a particular language, or all snapshots whose size (or any other scalar metric) falls within a given range. A search may also be conducted on the basis of strings associated with snapshots (snapshot, filenames in the codebase, etc.); potential string search mechanisms include regular expressions, globs (wildcard characters), and string search within ranges supplied by other search mechanisms. Finally, isolating all the snapshots in a particular project into a subset allows for longitudinal statistical comparisons to be run.

Once the target set has been isolated, data from each system can be collected and aggregated, e.g., by determining averages (or other statistical measures) for various scalar metrics, or by further subsetting. Ultimately, the extracted data, and basic statistics derived from it, may be condensed into a high-level summary of subset-wide values and metrics, which can then be stored with timestamp data and descriptive information about the nature of the subset under scrutiny.

Section 4: CQ, DQ, TQ, and SE Benchmarks and Descriptive Statistics 4.1.1 Descriptive Statistics Each analyzed system will have a set of descriptive statistics associated with it, which summarize the system's salient points. These may include statistics relating to real code/process metrics, modeled business outcomes, historical data (e.g., actual business outcomes, future project snapshots, refactoring data), and so on. All of this information forms a longer-term and more comprehensive picture of a given system, and may be used as inputs to statistical modeling.

Once data has been extracted and stored in the Zoo, it becomes possible to calculate basic descriptive statistics both within and across projects. These measures can facilitate understanding of the key individual features of each system, as well as high-level features that can be ascertained from looking at the spectrum of Zoo projects; in particular, descriptive statistics can be used in the formulation of benchmarks. Descriptive statistics and benchmarks could be stored in the Zoo or externally.

4.2 System for Generating Descriptive Statistics

To generate descriptive statistics, the Zoo data is passed through a number of basic statistical formulas and the outputs are stored appropriately. System-specific statistics, such as the mean or median of a particular CQ, DQ, or TQ value for all files in the codebase, can be calculated and stored in the appropriate system entry in the Zoo; Zoo-wide statistics, such as mean or median complexity values across all codebases in the Zoo, can be calculated and centralized into a high-level summary.

The statistical formulas used can define relationships between any pieces of data present in the data store, or consistent statistical transformations of that data; they can also change over time if needed, because the original data used for calculation will remain available. The generation of descriptive statistics can follow automatically from the placement of a new system's data into the Zoo.

4.3 Example Descriptive Statistics that can be Captured for Source Code Files

The tools and methods described herein do not pertain to any particular type of CQ, DQ, or TQ metric that may be captured for a software entity (such as a file). FIG. 8 shows an example of file-level descriptive statistics for illustration. This example shows 8 files written in different languages and with different sizes (in 'lines of code' or LOC). It shows values for three example quality metrics: "Core Periphery Type" (a DQ metric), "Cyclomatic Complexity" (a CQ metric), and "Test Coverage" (a TQ metric). These quality metrics will be used throughout this document for illustration.

An example CQ metric, sometimes called McCabe complexity, is the total number of possible routes through a function, accounting for all of its control flow statements (e.g., if-else conditions); a particular file's maximum cyclomatic complexity is the highest cyclomatic complexity exhibited by any single function in that file. Files can be assigned 'Cyclomatic Complexity' scores of 'low', 'medium', 'high', and 'untestable'.

An example DQ metric relates to architectural properties within the codebase. These software metrics can be computed using network-based techniques. They are defined in publications authored by Baldwin, MacCormack, Rusnak, and Sturtevant. Files can be assigned 'Core Periphery" complexity scores (in order of increasing complexity) of 'peripheral', 'shared', 'control', and 'core'.

An example TQ metric relates to the number of source lines of code exercised at least once when a software unit and system test suite is run. It is a ratio of lines exercised to overall number of lines in the source code file.

FIG. 8 also shows two parameters related to SE outcomes: lines modified to enhance the product and lines modified to fix bugs.

Various complexity scores, quality scores, and other metrics can be assigned to files or other entities in the codebase such as classes, methods, functions, data structures, etc.

FIG. 9 shows two examples of tables of descriptive statistics calculated on the system level rather than the file level, using an example system of 19 files. The first table shows files categorized by their 'core-periphery type.' The second shows files categorized by 'cyclomatic complexity type.' Each row shows the total lines of code (LOC) across all files in that segment, the number of files in that segment, and the percentages of the total that the first two numbers represent. Many other types and permutations of such statistics are possible.

FIG. 10 indicates the number of source code files in a system with each of the complexity classifications previously described. Eight successive snapshots of the same system are shown to illustrate the illustrate the evolution of the system.

FIG. 11 illustrates descriptive statistics that can be generated from a Zoo when multiple snapshots of the same codebase have been captured, when version control and issue tracking data has been incorporated, and when changes to files have been linked to the associated task in the version control system. When this data is available, activity between subsequent releases can be used to determine the number of files modified, the number of changes, and the number of lines of code (LOC) developed. This activity can be further segmented into 'bug fixing' activity and 'feature development' activity.

Similarly, FIG. 12 shows that a Zoo with more complete data can be used to link information about file characteristics (such as their age and size) with development process information.

4.4 Data Presentation

There are a number of possible ways for the descriptive statistics to be accessed and presented, depending on the user's requirements, including a command-line interface, web API, exporting data to a preformatted Excel or Tableau file, or presenting the data through a web portal. Again, the more technical options allow for enhanced customizability, while the more user-friendly options facilitate legibility and immediacy of understanding. Data can be transformed to allow for cross-system analysis or time-series analysis on a project to explore change (e.g. its evolution over time, or the impact of refactoring efforts).

4.5 Benchmarks

Benchmarking refers to the process of ordering systems in the Zoo according to certain metrics and then ranking specific systems along the scale. In benchmarking, various metrics from a particular codebase may be ranked against those from a database of such metrics from Zoo codebases, or a subset thereof (such as codebases of a similar size, or from the same project, organization, or industry), in order to determine how well formed the target code is along various axes of quality in comparison to others. Rankings may be as simple as upper vs. lower half, increasing in granularity to decile, percentile, or any other level desired, or calculated against a flat value (or set of values) rather than a particular rank. These results may be used as comparison points for newly analyzed systems, which can be plotted against the results in different ways.

Figure 13:
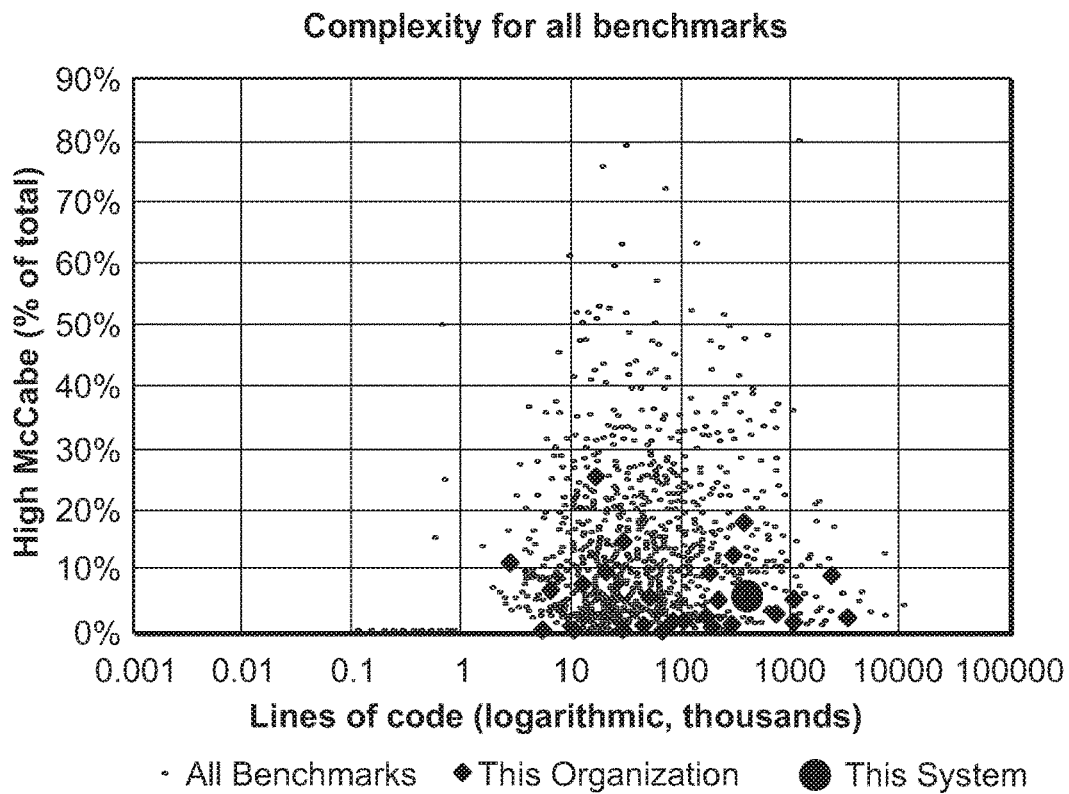
FIG. 13 is an exemplary complexity graph of a system with all benchmarks.

Some metrics are more useful as identifiers that can be combined through further calculation and modeling, rather than as elements in a ranked system in isolation. Examples include the number of files and lines of code, primary programming language, architecture and complexity metrics, and amount of change (measured in modified LOC or otherwise). FIG. 13 shows an example graph of a system whose cyclomatic complexity is measured against the complete Zoo, plotting the logarithm of the system's total LOC against the percentage of the system's files that fall into the high cyclomatic complexity segment. Files with high cyclomatic complexity should, generally speaking, be minimized in well-formed code.

Isolating comparable benchmarks, rather than the entire Zoo, permits a more nuanced understanding of a system's position. The selection of comparable systems can be user-specified in accordance with desired comparisons, or chosen automatically through code and process metrics. Common points of comparability include language, size, or belonging to the same team, department, organization, or industry. Choosing comparable systems can be helpful if the user is reasonably confident that the subset forms a representative group of systems to which the target system bears more resemblance than to the entire Zoo.

Figure 14:
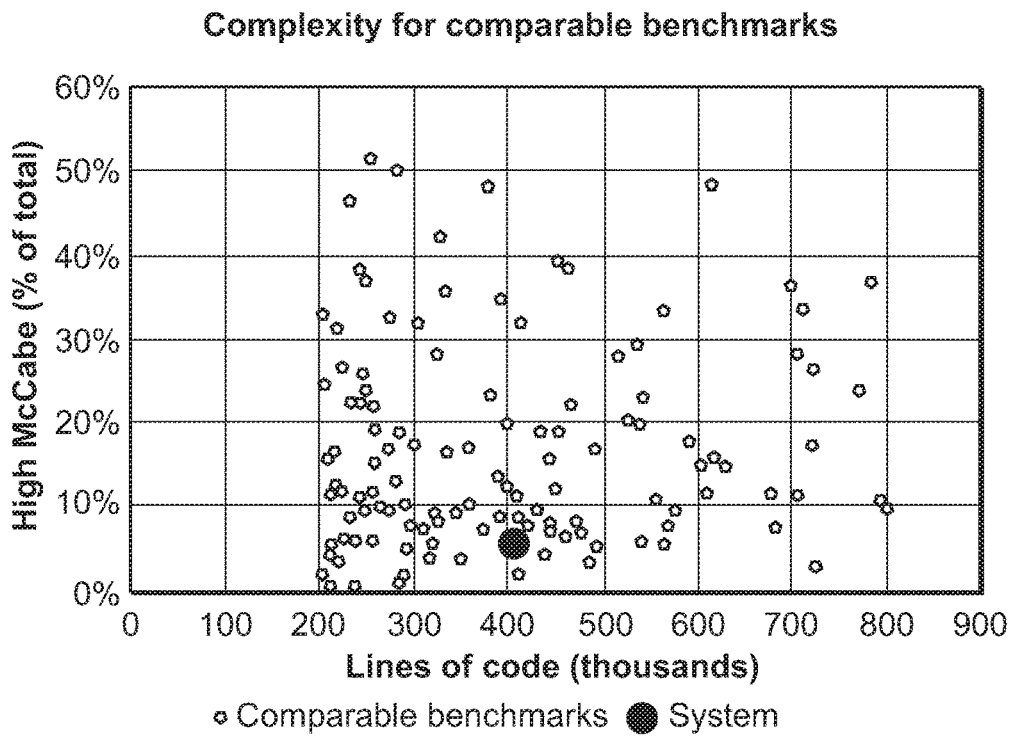
FIG. 14 is an exemplary complexity graph of a system with comparable benchmarks.

FIG. 14 shows a complexity graph similar to the full set, but using comparable systems instead of the entire Zoo.

Section 5: Tools to Create 'Custom Fitted Models' Linking CQ, DQ, TQ and Resulting Low-Level SE Metrics When a Zoo has been populated with code and project data, for a particular system, that data can be used as inputs into a model fitting regression. One skilled in the art of statistical analysis can examine data, construct appropriate regressions, and create 'custom fitted models' using a set of CQ, DQ, and TQ metrics as independent variables and SE outcome metrics as dependent variables. Regressions can be used to test the significance and strength of those relationships while controlling for other features. With enough data points, machine learning techniques rather than humans can also be used to construct and run regressions and to generate new or improved custom fitted models.

5.1 SE Outcomes that Matter

The most important SE outcomes are, generally speaking, those that relate to defects, productivity, cost, schedule, risk, and adaptability. Concepts that may be captured by important SE outcome parameters include:

(1) Productivity: Developer productivity for both feature development and bug-fixing can be computed by the model and aggregated accordingly. (See Sturtevant & MacCormack for methods)

(2) Defects: Defect ratios can be drawn directly from the model outputs, while the buildup of a backlog of defects in particular files can serve as an indicator of the degree to which those files are brittle and difficult to repair. (See Sturtevant & MacCormack for methods)

(3) Staff turnover: Human resource data can track those developers who quit or were fired, which in turn allows the tool to assign higher difficulty values to the individual files in which those developers spent the most time working. (See Sturtevant & MacCormack for methods)

(4) Growth rates: The growth rate of a project or of an organization, and the acceleration of those rates, can be determined from version control data and human resource data. These factors tend to lead to increased complexity of file interactions (unless mitigated through carefully modularized code) and thereby heighten defect probability and lower productivity, which can be reflected in parametric calculations for individual files in a project.

Project schedule & cost: The degree to which a project runs over its initial release schedule or budget can serve as an indicator of quality issues. The proportion of outright project failures from a team, department, or organization can indicate chronic problems in project design and structure.

5.2 Running Statistical Tests Linking CQ, DQ, and TQ Independent Variables to Low-Level SE Outcome Dependent Variables To create 'custom fitted models' for a system, regressions are set up according to certain hypotheses about the nature of the relationship between CQ, DQ, TQ, and low-SE outcomes. To illustrate, we include statistical tables from previously conducted studies.

The table if FIG. 15 shows a significant relationship between the complexity of source code files (measured along multiple dimensions) and the LOC modified to fix defects in those files after controlling for file size, file age, and the LOC modified to implement features during the same time window.

The table of FIG. 16 shows a significant relationship between the complexity of source code files developers work in in a time period and their productivity in that time period after controlling for individual effects, managerial status, years of employment, relative effort spent on bug fixes vs. features, relative effort spent dong 'green-field' development vs. work in legacy files.

The table of FIG. 17 shows the results of regression analysis looking into the probability of developer attrition (quitting or being fired) in relation to the amount of time spent in highly complex files when controlling for years employed, managerial status, production, time spent fixing bugs, time on new development (vs legacy). This shows a statistically significant relationship between working in poorly architected parts of a codebase and attrition.

These studies can be found in Dan Sturtevant's 2013 MIT dissertation titled "System Design and the Cost of Architectural Complexity."

Based on this study and others published by Baldwin, MacCormack, Rusnak, Sosa, Sturtevant, and others, it can reasonably be hypothesized that a large codebase with poor quality might experience low feature productivity for developers working in those parts of the code exhibiting low modularity.

5.3 Custom Fitted Models

Once statistical tests (such as those discussed above) have been run, the resulting 'custom fitted models' can be used to 'predict' or 'simulate' values of interest. Tools for doing so include the Zelig package in R or the statsmodels package in Python. By holding control variables constant, and varying input along independent variables of interest, we can capture information about the impact that an explanatory variable of interest (such as CQ, DQ, or TQ metrics) has on an independent variable such as 'lines of code modified to fix bugs', 'developer productivity', 'probability of attrition', 'probability that a bug is not caught during development', 'probability that a file contains a security vulnerability', etc. Using simulation or predictive techniques, one can make inferences and predict expected value and variance for some SE outcome datapoint given knowledge about characteristics of the independent variables.

For example, given the statistical tests similar to those shown here, and knowledge of mean values for control variables, it should be clear to a statistician how to derive expected values for the following 4 business outcome parameters as a function of complexity scores (for files) or % effort in complex files (for developers): (1) 'defect ratio'—the ratio of lines modified to fix bugs over lines modified to implement features in each file. More complex files have a higher defect ratio. (2) 'fallout ratio'-similar to defect ratio, but only including bugs that escape the development process in the numerator. (i.e. they have a potential impact on customers.) (3) 'feature productivity'—the productivity of developers (in terms of LOC produced or features delivered) per unit time when they are implementing features. (4) 'bug fix productivity'—the productivity of developers (in terms of LOC produced or features delivered) per unit time when they are implementing features.

'Custom fitted models' are calibrated by extracting CQ, DQ, TQ and low-level SE outcome data from the codebase and from project management systems for a single codebase. In addition to its primary function as an input to the process of creating custom fitted models, this set of data can be used to provide general identifying characteristics of the system so that a subset of comparable systems from the Zoo with which the target system can be more easily isolated, depending on user specifications (as will be discussed below).

5.4 Storing Fitted Models

'Custom fitted models' can be stored in a data store attached to a particular codebase snapshot.

Section 6: Tools to Create 'Standard Fitted Models' Linking CQ, DQ, TQ and Resulting Low-Level SE Metrics when Project Data is Incomplete or Missing When working with codebases in different environments it is possible data necessary to perform the calculations described above will be missing or incomplete. This section describes the construction of 'standard fitted models' in accordance with one or more embodiments from which missing data may be projected into a software system, allowing calculations described above to be performed with a reasonable approximation. The process falls into the following primary categories: projecting from a single system into another system, supplementing this projection with data from more than one system by creating a 'standard fitted model,' finally creating a 'standard fitted model' using comparable systems from which to derive missing information to ensure the approximation is reasonably accurate.

6.1 Applying 'Custom Fitted Models' from One System to Project SE Outcomes in Another when Data is Missing The description of the tool so far assumes complete data is available from the codebase and linked project management systems, allowing full calculation of calibrated SE outcome metrics to construct a 'custom fitted model'. However, in many cases, complete data may not be available to the tool for calculation purposes. In these cases, it is possible to instead use a 'custom fitted model' created from a codebase where this data is available to project SE outcomes into a codebase with missing or incomplete data. This allows similar calculations to be run, resulting in reasonably well-informed projections of SE outcome metrics. For instance, given a codebase with missing productivity data due to lack of task tracking information, it is possible to substitute productivity data from another codebase when performing these calculations to create a reasonable approximation.

6.2 Creating 'Standard Fitted Models'

When a Zoo contains multiple systems, it is possible to aggregate data from more than one system to create better-informed models from which to project data into a system with missing information. This process involves first identifying independent and dependent variables, and second applying statistical regression given those variables to identify trends and mitigate outliers.

6.2.1 Identifying Independent and Dependent Variables

Independent system variables include such values as system size, language, age, and system complexity metrics such as core size and propagation cost. These metrics represent measurable attributes of a system that provide details about its context and meaningfully impact dependent system variables.

Dependent system variables include such values as engineer productivity in lines of code, file defectfulness, and likelihood of critical defects occurrence in certain areas of a codebase. These metrics represent derived attributes of a system which provide details about its performance, business outcomes, and software economics. In general, these variables are considered to provide meaningful insight.

6.2.2 Applying Statistical Regression to Produce Expected Values

Given a set of independent variables and corresponding dependent variables from multiple systems it is possible to apply mathematical regression (linear, binomial, etc.) to create fitted predictive curves from which missing data may be projected. For instance, a system missing productivity data, and given two secondary systems with sets of independent variables and corresponding dependent variables, a regression model based on available data can be used to project a value for the missing productivity data. These regression models become more accurate as further system information is added to the Zoo.

6.3 Selection of Comparable Models for Construction of an Appropriate 'Standard Fitted Model'

As data points are added to a Zoo, it becomes possible to restrict systems from which a 'standard fitted model' is created to those systems with which the target system shares attributes. Systems with similar independent variable attributes, such as language, size, organizational relationship, etc., are considered comparable. When used as an element of the projection modeling process comparable data sets allow a model to be fine-tuned to produce more accurate projections. Standard fitted models derived from comparable systems (as opposed to the entire Zoo) are more useful when projecting data into systems with missing information.

6.4 Example: Scenario Analysis Using 'Custom Fitted Models' and 'Standard Fitted Models'

An application of creating a 'custom fitted model' and more generally a 'standard fitted model' is to perform outcome prediction of meaningful metrics on systems for which information is missing. Specifically, these models allow a codebase to be examined and produce predictions of its status at time t2, given data at time t1 and possibly also at time t0. The modeling process is thereby able to "train" models to the point that they will be able to take a completely new codebase, even when project management data is unavailable or incomplete, and make predictions of its future condition at a target point in time, given variable inputs.

The chief goal is to develop a general statistical modeling mechanism that unites data elements to evaluate at least three different goals: (1) to calculate business outcome metrics by combining code metrics, process metrics, and Zoo data; (2) to project various metrics by supplementing standard calculations with historical data from the Zoo when certain elements of the primary modeling method, such as process metrics, are unavailable for projects; and (3) to estimate future changes in projects based on historical data from the Zoo and user inputs.

From the models associated with individual points in time, generalized models for the entire codebase can also be produced targeting outcomes, as well as a single codebase-wide model for a consistent set of outcomes, allowing easier comparisons with other codebase models; these high-level models can be stored in databases specific to a single outcome or a set of outcomes. Applying data from a new 'standard' or 'custom' fitted model requires first refining the model using correlation significance, verifying the outcomes of the model against any available real data, calibrating projected values as necessary following the verification, and finally adding the data back into the Zoo as a new point of data to refine existing and future models.

6.4.1 Refine Projections Using Significance and Relationship Strength

When projections are first made from a 'custom' or 'standard' fitted model into a system missing data, hypotheses are made and then verified about the possible impacts of independent variables on meaningful dependent variables. An example hypothesis may be how much defect-related activity occurs in the files of a particular system's core, or, in other words, to what degree "coreness" contributes to the presence of defects. Any input metric and any desired outcome may be checked for meaningful linkage given appropriate data.

Regressions, among other methods, may be used to determine these correlations. Correlations appearing to be statistically significant can then be verified by controlling for other potential confounding variables; this can be done by setting other variables to constant values, such as their mean values, and determining whether the apparent correlation still holds true. Once this modeling has been done on a system-specific basis for the desired outcomes, it can be conducted in a cross-system or multi-system fashion to verify that the suspected correlations are still true for larger and more diverse datasets.

If the suspected relationships continue to be found valid, the appropriate correlation coefficients can be utilized in the formula(s) intended to project the targeted outcome. These projections are grouped together by expected use case—such as for systems with nothing but a codebase, or with a codebase plus a version control system, etc. When used, the appropriate group of formulas is selected for use in the projection model to estimate the full set of necessary business outcomes, which in turn are used for calculations of technical debt, etc.

6.4.2 Verify Projection Consistency Using Multiple Derivation

If a project includes process metrics it is possible to perform a verification of the model's accuracy by deriving the same results by multiple means—ensuring results are within an acceptable margin. For example, if the project includes both version control data (from which file-specific activity levels can be computed) and human resource data (including number of active developers and experience levels), but not issue tracking data, it is possible to estimate productivity levels in the codebase through at least two different methods. The estimated results may be compared with each other to verify both calculations. If the model has been set up correctly, there should be no significant difference between results of the different methods.

6.4.3 Compute Calibrated Parameters from this System to Compare Against Projections Projected values may be calibrated by comparing projected parameters against actual parameters, i.e., compare output calculated with real metrics against projected outputs calculated with a mixture of real and modeled metrics. This assists in determining whether the model's estimations fall within an acceptable range of accuracy, and insure against flaws that could skew modeling results.

In a fully calibrated system, real parameters can be compared against parameters that have been calculated from a version of the system from which certain metrics have been artificially excluded, forcing the model to project those metrics instead. This serves as a means of verifying the model's projection abilities for future cases where full calibration is not available. In a system that is not fully calibrated, certain calibrated metrics can still be calculated from the real data and compared in the same way against projected metrics from the model.

6.4.4 Add Calibrated System's Information to Zoo (Another Data Point)

To improve quality of the model's projection abilities over time, new systems can be added to the Zoo as the tool receives them. This allows a project to be utilized for future analysis, both as a data point to refine the overall Zoo and, to a more significant degree for those projects where it is relevant, as a potentially comparable system. For more details on this process, see Section 2.

Section 7: Analytic Tool for Producing Higher-Level SE Metrics

7.1 Higher-Level Derived SE Metrics with User Input

Using low-level (first level) SE outcome metrics produced by 'custom fitted models' or 'standard fitted models', a tool in accordance with one or more embodiments can compute additional higher-level (second level) SE outcome metrics that are managerially interesting. Examples include metrics related to maintainability, agility, cost, risk, waste, security, and technical debt. These will be used in this section as examples but do not constitute an exhaustive list of possible high-level SE outcome metrics. These metrics may be calculated on a file-by-file basis or on various levels of aggregation, depending on user preference.

Tools may analytically compute SE metrics using the outputs from 'custom fitted models' or 'standard fitted models' in combination with other information provided from benchmarks, from descriptive statistics, from information drawn from version control or change management systems, or information provided by a tool user with project knowledge.

7.2 User Inputs to Higher-Level SE Metric Computation

Where expert knowledge is required, tools give users the ability to set and test different parameters of interest for use in higher-level SE metric computation. Examples of modifiable parameters that might be set by a user include: (1) Amount of code modified annually (% code turnover) is useful when only code is available for automated analysis by the tool, and data from version control is unavailable. This can be used to estimate the amount of labor going on in a codebase when used in combination with productivity estimates. (2) Current knowledge or future expectations about the number of developers that will be working in a codebase. This can be used to estimate the amount of code change when used in combination with productivity estimates. (3) The number of years and amount of development labor that will be expended before system decommissioning. This can be useful when reasoning about whether a CQ, DQ, or TQ improvement initiative will pay off. (4) The downstream cost of bugs that escape the development and QA process and are deployed (higher in nuclear plant control code than a cell-phone app.) (5) Developer salary. (6) The discount rate used in 'present value' financial calculations estimating ROI.

Some of these examples are shown in the example tool graphical user interface (GUI) shown in FIG. 18.

Higher level SE metrics computed from low-level 'fitted model' SE projections, other metrics, and user input can include: (1) Delta features: LOC expected to be modified over the time period to implement features in the system. (2) Delta bugs: LOC expected to be modified over the time period to fix bugs in the system. Files with greater complexity generally require more defect correction than those with lower complexity. (3) Bug LOC released: LOC expected to be modified over the time period to fix bugs that were released to end users, with the potential to have an adverse impact downstream. Files with greater complexity have more bugs with downstream impact than those with lower complexity.

Based on these parameters, along with the others discussed earlier in this section, at least three cost subtotals can be calculated, though others are conceivable (e.g. a more specific subtotal dealing with security risk): (1) Bugfixing and feature development costs: Expected development effort (in the cost of full-time equivalents (FTEs), defined as the amount of work done by one full-time employee over the time period) allocated to fix bugs or develop features in the codebase, based partly on the relevant productivity metrics. Productivity is higher when developers work in code with lower architectural complexity and when they are implementing features, and lower when they are fixing bugs. This figure can also be considered the cost of continuing development. (2) Downstream risk of released bugs: Expected cost over some time-period resulting from bugs in the deployed system, based partly on the "delta bugs" number from above. Downstream impact (the total downstream risk and cost of released defects relating to, e.g., security, safety, recall, user productivity, waste, or reputation) is higher in code with higher complexity. (3) Staff turnover costs: Expected cost over the time period resulting from staff turnover and the ensuing productivity decreases, human capital loss, and knowledge loss. Using developer experience data, productivity metrics, and known features of the nature of the developer learning curve, it is possible to trace the effects of quality issues on attrition rates, productivity rates, and their associated costs.

These metrics and others will be shown as examples in the next section.

7.3 Weighting and Aggregation

Because 'fitted models' are often derived with the 'source code file' or 'person' as the unit of analysis, high-level metrics are often computed at the file-level or individual level as well. For example, file-level CQ, DQ, or TQ metrics might be inputted into a fitted model to get a file-level score for potential for bugs in the next development period. It is possible to aggregate file-level information at the module, directory, or whole-system level as well using weighed sums or averages. It is similarly possible to aggregate person-level information to the team, division, or whole-organization level. This section will describe aggregation methods, using the 'source file' in future examples.

Before each calculation step, some details are determined about the relationships between the metrics of individual files: namely, each file is weighted relative to others in the system. The weighting factor can be dependent on different file-level parameters, such as LOC, LOC changed over a given time period (extractable from version control data), LOC changed over time to fix bugs or develop features, and so on. If metrics are being calculated across multiple files, the level of aggregation is also specified: sets of files within the same directory, module, or entire system may be grouped together for analysis purposes, or even files across multiple systems.

Figure 19:
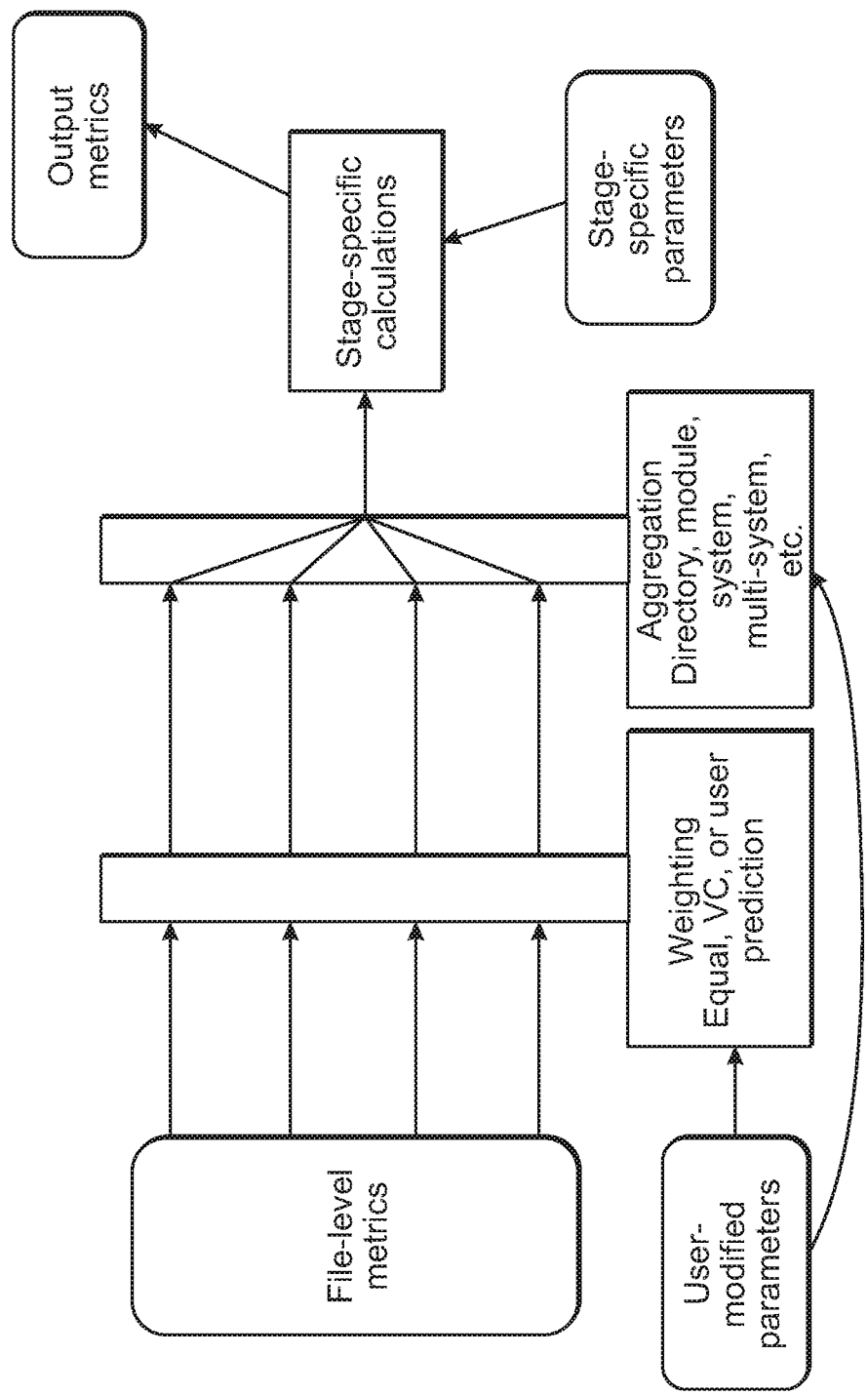
FIG. 19 is a flow diagram showing weighting and aggregating individual file metrics before calculating additional business outcome metrics.

FIG. 19 shows the exemplary weighting and aggregation steps in the context of business outcome calculations. File-level metrics are weighted and aggregated according to user specifications, then fed into the calculations that are specific to the desired set of new metrics, along with any particular parameters (user-defined, Zoo-derived, etc.) that are specifically needed for those calculations.

The weighting process can take a number of different forms depending on what information is available, as specified by user input. If a change-based weighting factor is desired, e.g., and the system has linked version control data showing the precise amount of activity on a file-by-file basis, the option exists for each file to be weighted according to activity over a specified period of time. If no such data is available, the rate of change can be estimated by applying a flat global activity rate equally to each file, or by the predicted degree of development activity in different sections of the codebase as specified by the user.

The aggregation process, if needed, can occur at the level of the directory, module, system, collection of systems, or any other desired segmentation, depending on the user's specifications. The files are grouped together to calculate weighted averages for each input metric for that group, which in turn are fed as single inputs into the stage-specific calculations, resulting in output metrics specific to that group. If the aggregation step is eschewed, then the weighted metrics can be fed into the stage-specific calculations on a file-by-file basis, producing output metrics for each file independently.

Figure 20:
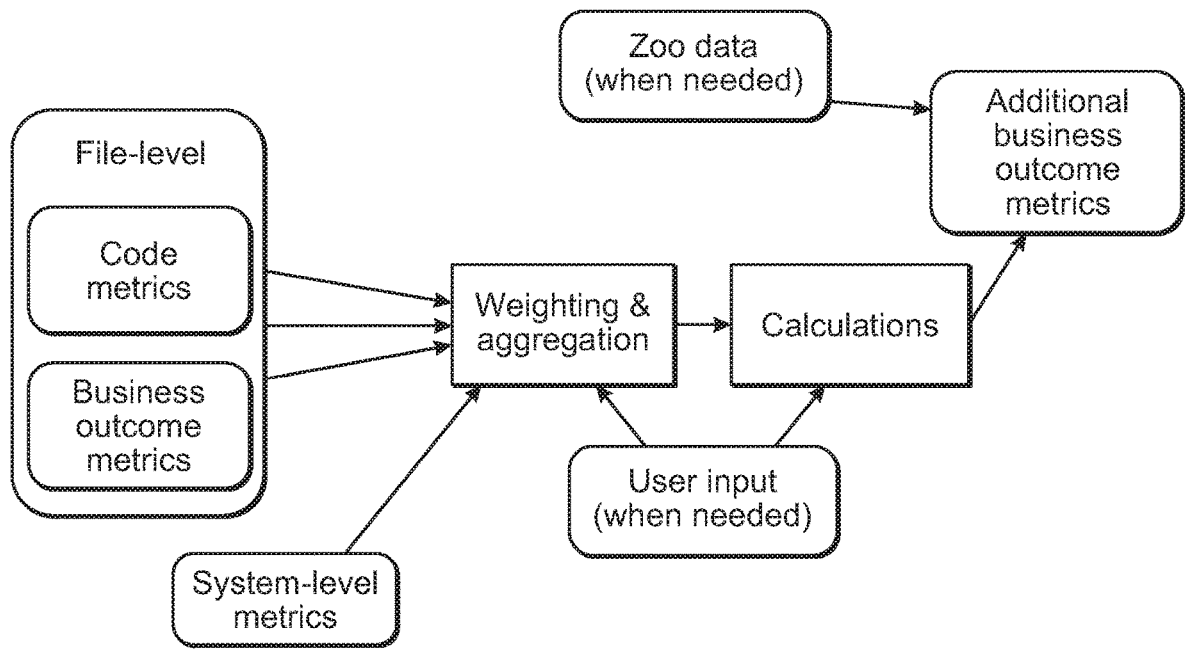
FIG. 20 is a flow diagram showing an exemplary generalized method of calculating additional business outcome metrics.

FIG. 20 shows a generalized method of calculating additional business outcome metrics (such as maintainability, agility, cost, and technical debt) from a combination of user input, Zoo data, and code metrics and business metrics (the latter being direct outputs of the modeling process) on both a file and system level. Values for system-level metrics can be distributed to individual files according to the weighting method utilized. Different versions of this method can be used, with varying inputs and calculations, to produce different business outcome metrics. Examples of the groups of metrics that can be calculated, as well as examples of individual metrics within those groups, are given below.

Section 8: Tool to Help Managers Explore Software Economics and Software Quality on a Project where Project Data May be Unavailable or Incomplete A tool in accordance with one or more embodiments is intended for software leaders can help with strategic decision-making by enabling the combination of information including: (1) scanned CQ, DQ, and TQ information from a codebase, (2) project SE information, SE estimates from a 'custom fitted model' or SE projections from a 'standard fitted model', (3) user inputted values related to code, CQ, DQ, TQ, SE, project, or program information, and (4) benchmarks.

Among other things, this tool allows leaders to explore the economics of development on top of an existing codebase and to reason about the value of redesign, rewriting, or some other improvement. The following examples contain screenshots from tool GUIs to illustrate utility.

8.1 Example: Maintainability

Maintainability is related to how many bugs there are in a system, how many new bugs result from ongoing development, and/or the effort/cost required to fix bugs. This could be measured in terms of total bugs, lines of code that must be modified to fix those bugs, or the defect ratio when adding new code (for calculations of the latter, see Section 4). Statistical models developed by performing regression analysis on systems in the Zoo can be used to predict a defect ratio for files in a newly analyzed system. Similar regression analysis may have been done on prior Zoo systems to compute feature productivity, bug productivity, and downstream risk.

Productivity can be measured in lines of code (LOC) produced in a year for a given activity type (feature development or bugs fixing). It makes sense to distinguish between these activities because developers are less productive when fixing lines of buggy code (in terms of LOC produced per unit time) because bug fixing involves significant investigative activity. Most bugs will be caught and fixed by developers prior to release, which can be very time-consuming. Some bugs may be missed by the developers and will emerge in the shipped product; there is therefore a downstream cost associated with missed bugs.

Figure 21:
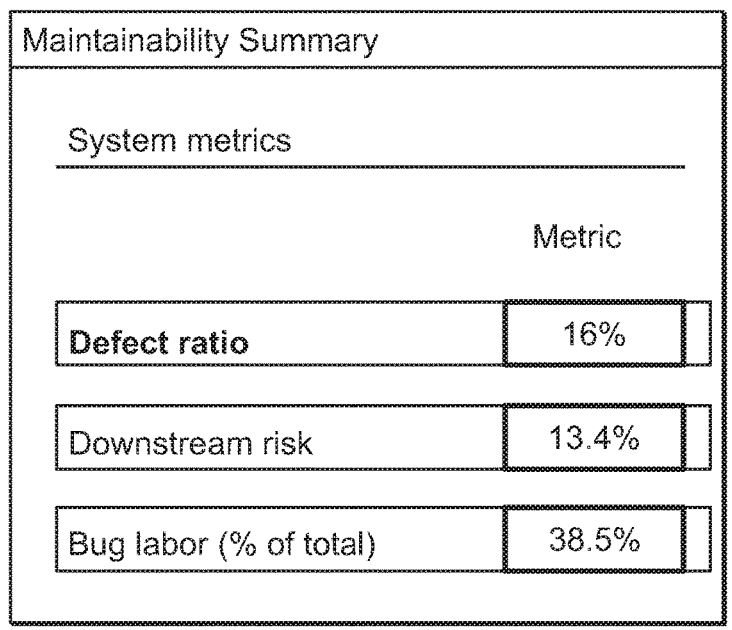
FIG. 21 is an exemplary maintainability summary screenshot from a tool.

As an example, FIG. 21 shows summary maintainability metrics for an entire system in a situation where code was available, but version control and issue tracking data was not. In this example (and all subsequent examples in this section), CQ and DQ measures were taken for the system and for each file in that system. File level 'standard fitted models' were applied to compute file-level low-level projections for: (1) Defect ratio'—the ratio of defect correction LOC to feature development LOC over some period of time. (2) 'Downstream risk'—the ratio of released defect correction LOC to feature development LOC over some period of time. 'Released defects' are those that are shipped into production or to customers rather than being caught in the development process. (3) Developer productivity when coding features (in changed LOC/time). (4) Developer productivity when fixing bugs (in changed LOC/time).

These low level metrics were then aggregated to the system-level using a weighted average formula, where files with more LOC volume are weighted more heavily. (This aggregation method assumes that every LOC in the system was equally likely to be worked on.) 'Bug labor %' was computed by algebraically combining the 'defect ratio' (which is the ratio of lines changed for bugs vs non-bugs) with 'Developer bug-fix productivity' and 'Developer feature development productivity' (both in units of changed LOC/time) to arrive at an estimate for the amount of labor hours spent fixing bugs vs In FIG. 22, we see a detailed analysis showing how the high-level summary statistics were arrived at. Such an analysis can help senior leaders understand the relationship between CQ, DQ, and TQ in a codebase. In this GUI, panels on the left show code metrics extracted from a code-base such as 'Total lines of code', user entered estimates or assumptions such as 'Code turnover per year', and low-level SE projections such as 'Bug productivity'. On the right, we see higher-level SE projections such as 'Lines of bug code shipped'.

Figure 23:
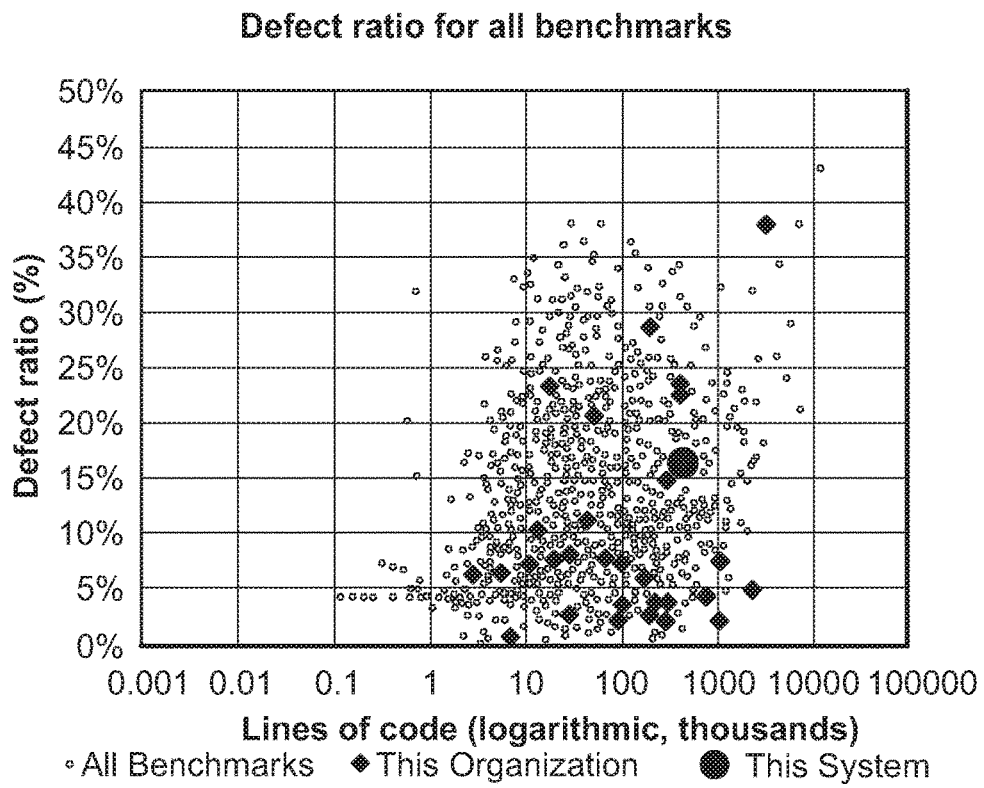
FIG. 23 is a graph illustrating exemplary defect ratio benchmarks with all systems in a Zoo.
Figure 24:
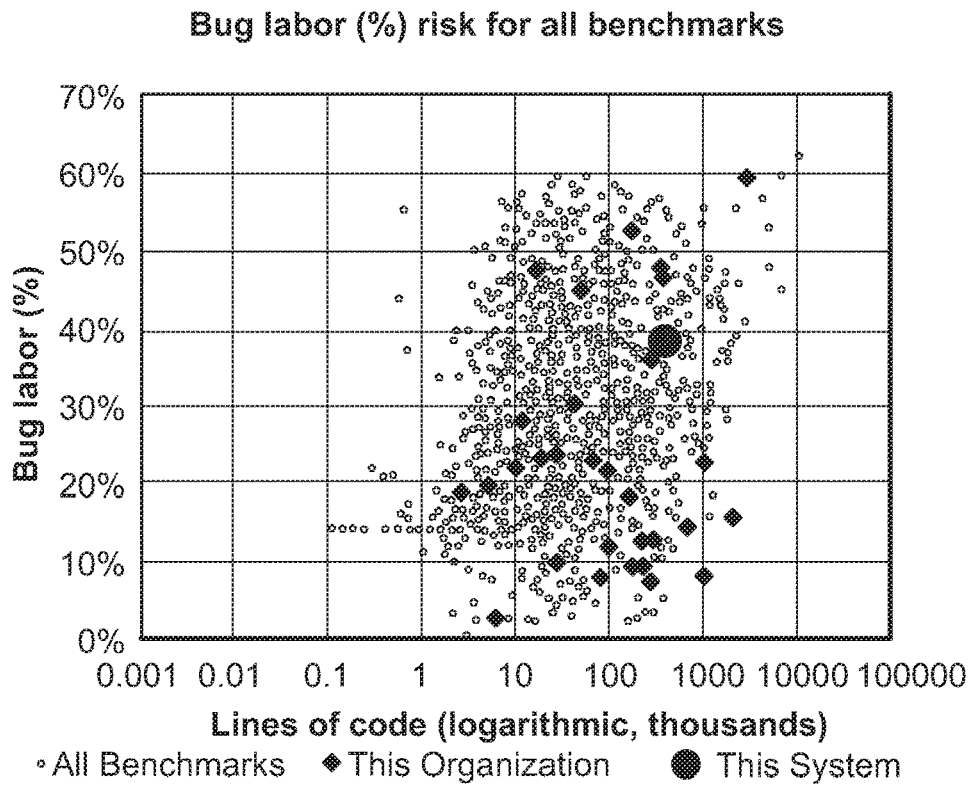
FIG. 24 is a graph illustrating an exemplary bug labor benchmark vs all systems in a Zoo.

FIGS. 23 and 24 show benchmark scatter plots for two maintainability metrics. In both plots, the X-axis is system size (in LOC on a log scale). Each data-point is computed by applying 'standard fitted models' to each system's code metrics. Some systems in this plot were used source data to create 'custom fitted models' that were used to generate 'standard fitted models.' These charts can show a manager where their system stands relative to others, and helps them understand if there is a problem and if there is room to improve.

8.2 Example: Agility

Agility is related to how much time it takes to develop code and how much waste is associated with that development. A programmer introduces bugs that must be eliminated as he or she generates feature code, as discussed in the "Maintainability" section above, and a line of bug code takes more time to fix than a line of feature code takes to develop. Furthermore, programmers are less productive on both feature and bug code when working in files with high complexity and low modularity. There are therefore at least two forms of waste accrued by agility problems: (1) time spent debugging and (2) lost productivity. These are indicated in the subsections below as schedule implications and waste implications.

In terms of specific metrics, agility can be measured by factors such as lines of code written per day, or days needed to write a given number of lines of code. The measurement of agility problems can be conducted in at least two ways: comparison against internal targets or against external benchmarks. Internally, the pace of actual or average estimated code development can be analyzed to determine the degree of deviation from the desired schedule. Modifications to inputs can show how the pace of development would change under various hypothetical situations.

FIG. 25 shows SE outcome projections from 'standard fitted models' for 'feature productivity' and 'bug productivity'. In combination with projections of the amount of time the developer will spend in bug-fixing vs feature development, and with other information from the input panel, we can compute an SE estimate for the days required to develop and ship a bug-free 1000 LOC feature. This assumes the developer will need time to develop the feature, and time to find and fix the bugs that are introduced or exposed during that development process.

8.3 Schedule Implications

FIG. 26 shows details of calculations used to arrive at the high-level summary stats. On the left, we see values captured from the codebase, computed using 'standard fitted models', or computed somewhere else in the application (number of FTEs required annually for 'bug fixing' and 'feature development'). On the right side, we see calculated values showing how we arrive at the number of weeks required to develop 1000 LOC in this system.

Figure 27:
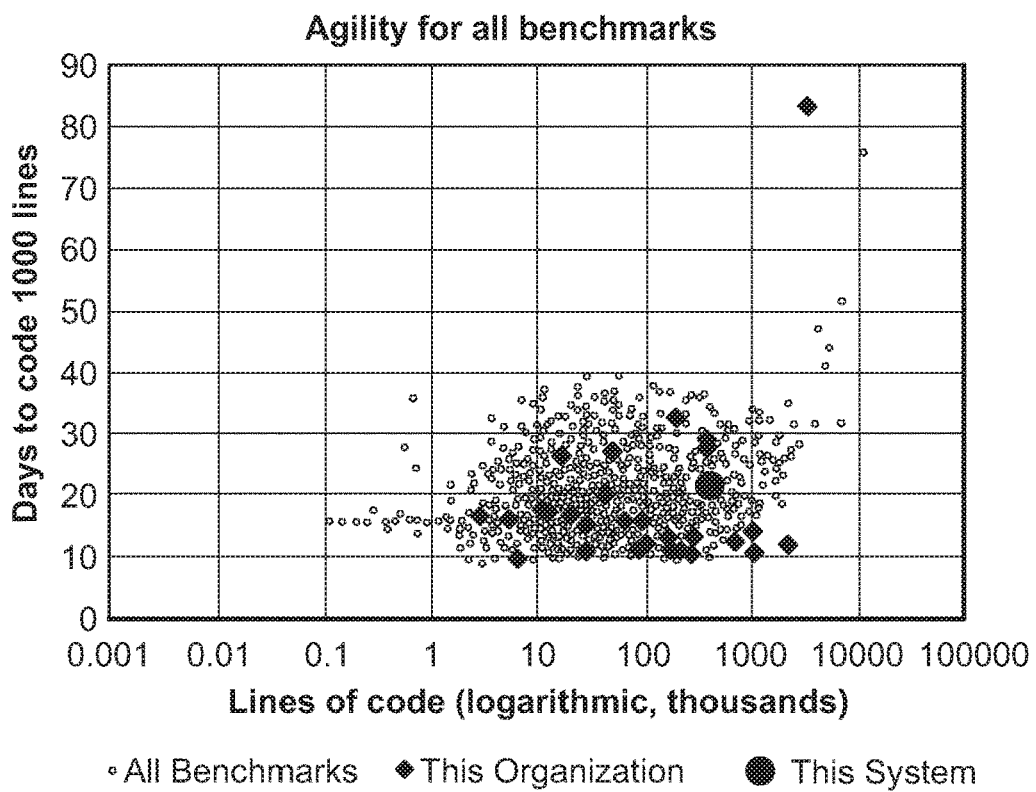
FIG. 27 is a graph showing an agility score (log of LOC vs. days to complete 1000 LOC) for an example system, measured against all benchmarks in a Zoo.
Figure 28:
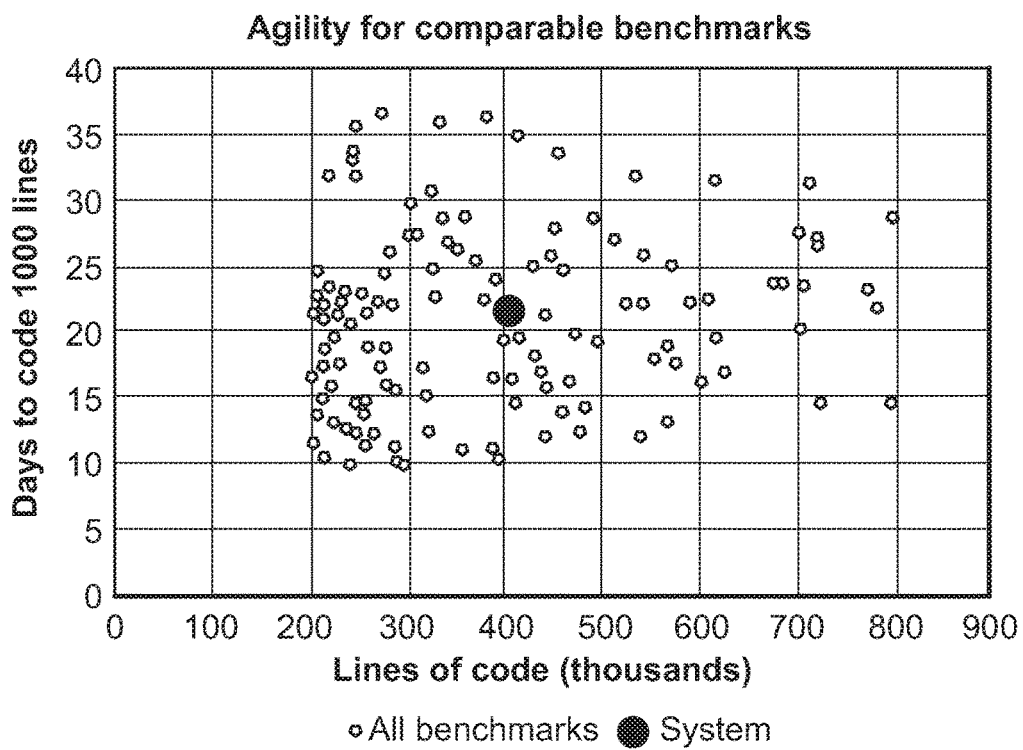
FIG. 28 is a graph showing an agility score (log of LOC vs. days to complete 1000 LOC) for an example system, measured against selected comparable benchmarks.

FIGS. 27 and 28 show benchmarks comparing the system being examined against other codebases in the Zoo. Standard fitted models and analytic methods are applied to all codebases to arrive at projections for 'days to code 1000 lines.' The first chart shows comparisons against all Zoo systems. Small blue dots indicate other systems from the same organization. Different subsets can be used for benchmarking and comparison purposes. The second chart shows the system relative to a chosen subset thought to be 'representative.' The subset includes systems written in the same language have more than half and less than double the number of LOC contained in the system under examination.

8.4 Waste Implications

In terms of external benchmarking, the overall efficiency of development in a system can be determined by comparing time to produce a given number of lines of code in the system to the same number of lines of code in other systems, whether the full Zoo, a comparable subset, or an "optimal" system—that is, one from the top decile (or other segment, if desired) of the Zoo. Zoo data is thus used as a stage-specific parameter in the final calculation to isolate benchmarks against which waste implications can be calculated.

FIG. 29 shows detailed analysis related to waste during the development process. Less than optimal quality (CQ, DQ, or TQ) will lead to lost productivity, extra bugs, more downstream cost, and other sources of cost and schedule slippage. This GUI allows a software leader to compare the software economics of their system against one considered 'optimal'. (An 'optimal' system is one in the top 10% of Zoo benchmarks in this case.) This picture shows the amount of time required to develop and ship a 1000 LOC feature in the codebase being examined (22 days of developer time) vs the 'optimal' system (13 days).

Figures 30, 31:
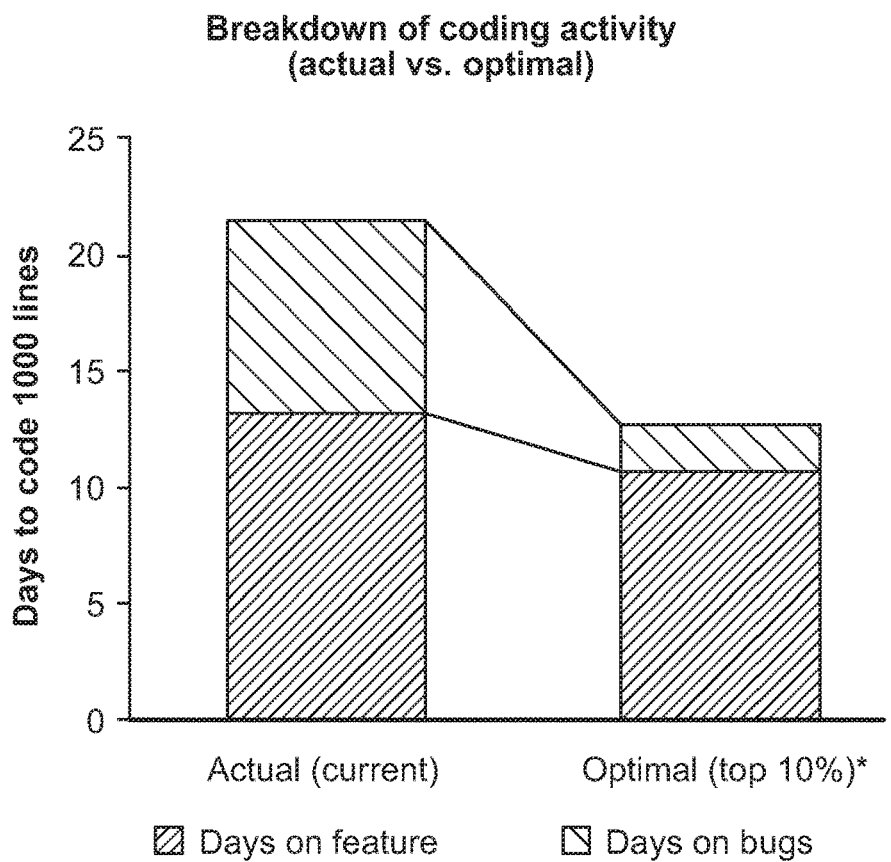
FIG. 30 illustrates an exemplary breakdown of coding activity during the development of a 1000 LOC feature.
FIG. 31 shows an exemplary cost summary screenshot from a tool.

FIG. 30 shows a comparison between the system and the 'optimal' system, which in this example comes from the top 10% of all systems in the Zoo (though this value is adjustable, as is the set of systems to draw from). Drawing comparisons with the optimal system allows for more precise calculations of the waste present in various metrics of the system (feature development days and bug-fixing days, in this example) that can be traced to suboptimal CQ, DQ, or TQ features. This figure illustrates the time lost from less-than-optimal feature productivity (in blue) and from more bugs and low bug-fix productivity (in red).

8.5 Example: Labor and Risk Related Cost

The cost of a system can be measured through transformations of various metrics, such as developer productivity, the number of bugs introduced, and the salary of developers. The annual code turnover rate will determine the magnitude of the total cost per year. Bugs that are not fixed, based on the downstream risk, have an associated cost per line that may be estimated by the user. Essentially, cost metrics show the amount of money required to keep code development continuing at its current pace, as well as the relationship between code quality problems and the degree of downstream cost & risk being generated. Downstream cost and risk is related to the number of bugs that are shipped or deployed (rather than being caught during development) and the probabilistic cost associated with each. The cost or risk of bugs in production will be higher in a nuclear plant than in a cell-phone App, for instance. These values are given as labor cost and risk cost below, respectively.

As with agility measurements, cost can be measured against both internal and external baselines. Internal budgets can be used to determine how much the project is deviating from expectations, and input modifications can show hypothetical changes. Development efficiency can be determined by comparing the cost of producing a given number of lines of code in this system to the same number of lines of code in an optimal system, as calculated from the Zoo.

FIG. 31 shows summary statistics for the cost of developing a 1000 LOC feature and for the cost associated with downstream risk. The first is a function of the labor-days required for development and developer salary. The second is a function of the probability that bugs are shipped and the expected value of cost associated with each bug that has a customer impact. Risk is a probabilistic concept. Some bugs will have relatively low costs (support calls to a call center) while others will be large (property destruction or loss of life.) The probability of bugs, combined with a risk model can be used to generate appropriate estimates for cost that are application specific. Also shown in this panel is a measure of 'technical debt' which will be explained in later sections.

FIG. 32 shows a detailed calculation of cost and waste relative to the 'optimal' system. It relies on previous calculations from the 'maintainability' and 'agility' panels. Development time (and wasted time) can be directly translated into money.

The example above shows the same example of how labor-related metrics (full-time equivalents and the resulting labor cost, both on an annual basis) can be calculated, using the same code metrics and model results as in the maintainability example, as well as the previously calculated outputs of that example: new LOC and new bug LOC. (Note that not all cost metrics are reliant upon maintainability metrics for their calculation; however, this example demonstrates that such linking between additional SE metrics is possible.) Developer salary is included as an additional user-supplied or data-derived input.

The full-time equivalent (FTE) value is the sum of the feature and bug FTE values which are the new LOC and new bug LOC values divided by their respective productivity rates (i.e. the amount of work needed to develop the target LOC at the given productivity rate). The labor cost is the number of FTEs multiplied by the annual developer salary. All of these calculated figures can be totaled and averaged according to the same weighting system as in previous sections.

It also shows how risk-related metrics (shipped bug LOC and the resulting risk cost, both on an annual basis) can be calculated, using the same code metrics and 'standard fitted model' results as in previous examples, as well as the new LOC value from the maintainability section. The user estimate of the downstream risk cost per bug line of code is included as well.

The lines of bug code that are expected to be shipped to the end user can be calculated by using a standard fitted model' to estimate a downstream risk ratio. Applying this downstream risk factor to the new lines of code (i.e. the proportion of released feature LOC that can be expected to contain unknown bugs). The risk cost is the shipped bug LOC multiplied by the downstream risk cost per bug LOC. Again, these figures can be totaled and averaged according to the previously utilized weighting system.

As with agility, it is possible to determine measures of efficiency for the funds spent on a particular project's development by comparing the cost to produce a given number of lines of code in the target system versus others. The costs of a system's development that exceed those of an "optimal" system, isolated via Zoo data as in the agility example, can be considered as waste in the system.

Figure 33:
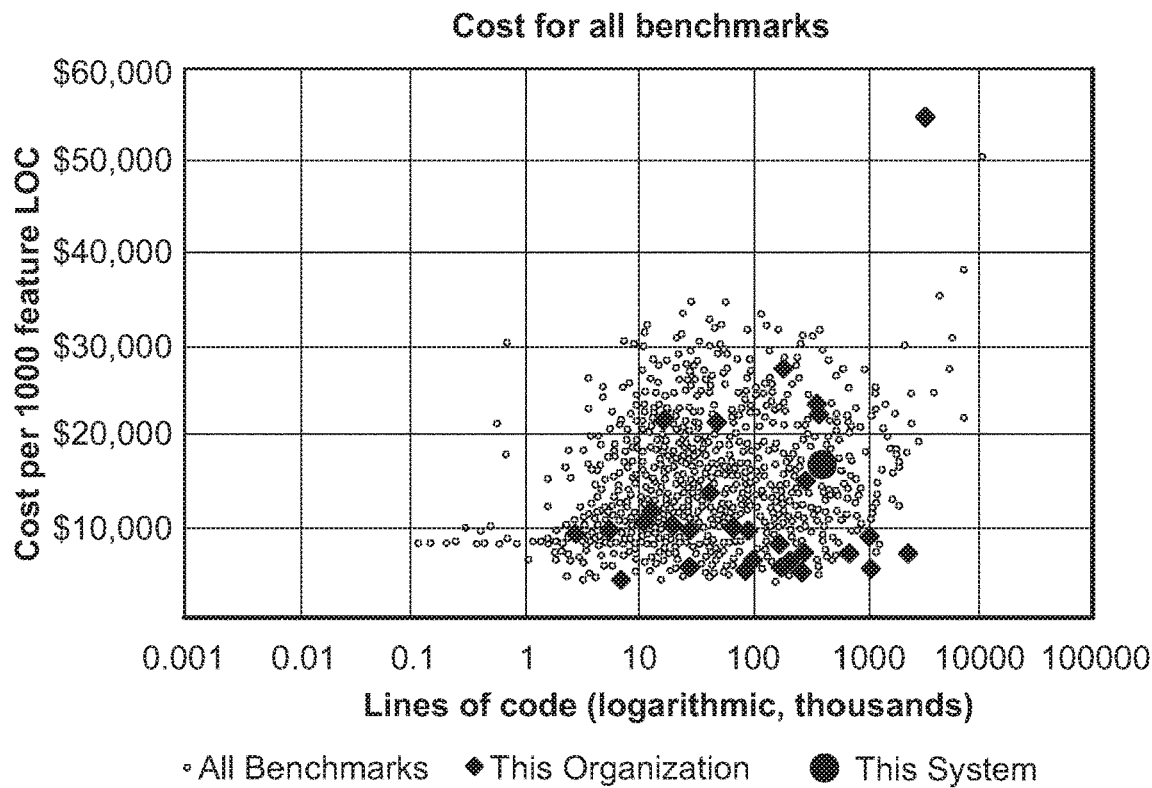
FIG. 33 is a graph showing cost score (log of LOC vs. cost per 1000 LOC) for an example system, measured against all benchmarks in a Zoo.
Figure 34:
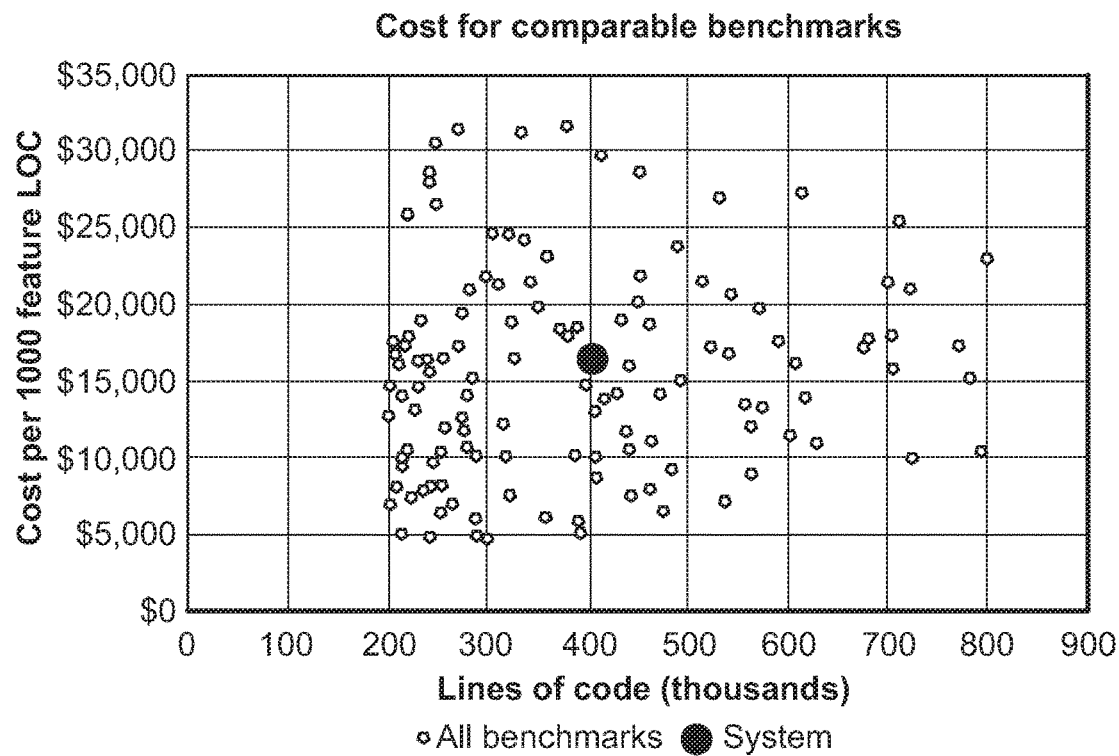
FIG. 34 is a graph showing cost score (log of LOC vs. cost per 1000 LOC) for an example system, measured against selected comparable benchmarks.
Figure 35:
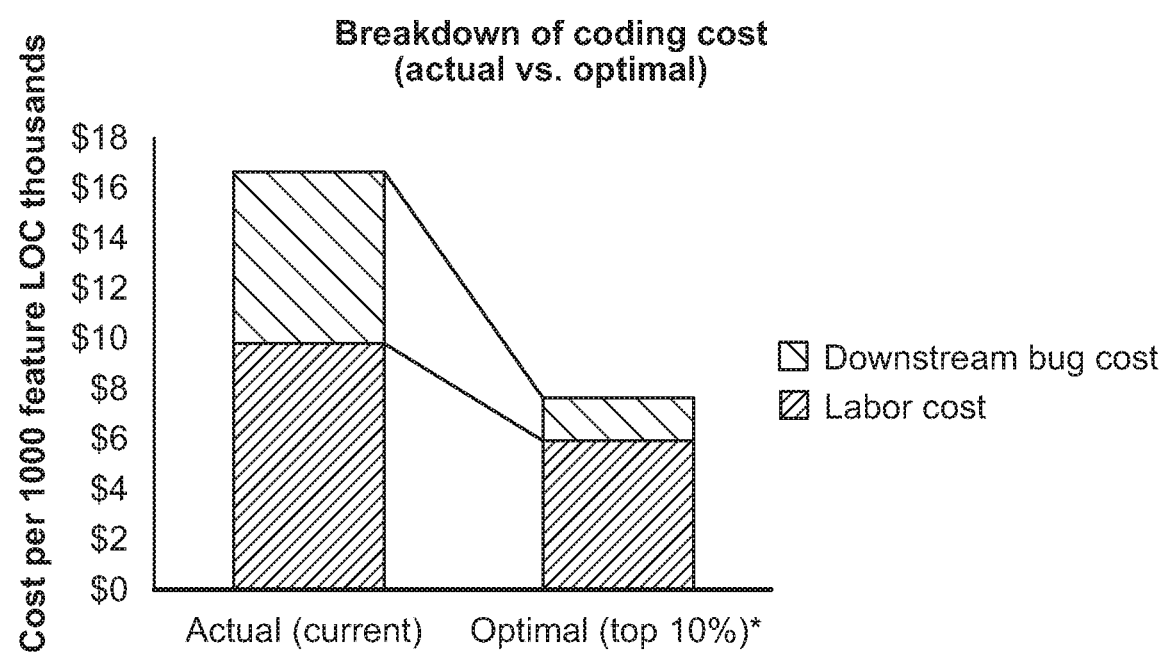
FIG. 35 is a graph showing cost score (cost per 1000 LOC for an example system, measured against an optimal system from the top decile of the Zoo.

FIGS. 33, 34, and 35 show a cost-based approach to waste calculation for the same system that was benchmarked in the agility section above, using cost per 1000 LOC as the key metric. They show a comparison with the entire Zoo, a comparison with selected comparable, and a comparison against an optimal system from the top decile of the Zoo.

Section 9: Tool to Help Managers Explore the Economics of Refactoring, Rewrite, or Quality Improvement Opportunities A tool intended for managers explores the projected long term impact of strategic decision-making by treating hypothetical CQ, DQ, and TQ improvements as financial instruments when combined with a 'standard' or 'calibrated fitted model.' This tool allows decision makers to reason about long term costs, benefits, and overall return on investment of various software improvement initiatives, and to explore optimal strategic direction and investment balance. The approach described here can be applied to various file attributes categorized as CQ, DQ, and TQ, providing a full picture of strategic choice to software decision makers. The following examples contain screen-shots from tool GUIs to illustrate this utility.

9.1 Example: Valuing Quality Initiatives

A hypothetical software initiative may consist of exploring the financial impact of investing time and money in improving CQ, DQ, or TQ by improving certain metrics in a code base. A tool may be written to determine the estimated value of such initiatives by projecting outcomes from a 'custom' or 'standard' fitted model given hypothetical improvements to certain independent variables.

FIG. 36 illustrates an example of assumptions and client-provided data enabling hypothetical decision valuation.

Such valuations depend on calculating two values: total cost of the proposed initiative, and total benefit of the proposed initiative. When provided such data as number of developers working in a code base, cost of engineering per developer, downstream risk per defect that escapes test, and the number of lines of code modified to fix defects in the code base per year (among others) it becomes possible to calculate the total cost of a proposed software initiative. If an estimated duration of the initiative is also known, it becomes possible to turn this total cost into a "net present cost" by properly discounting the cost over the number of years expected.

Similarly, information regarding expected benefit of the initiative must be known and can be reasonably estimated given a 'custom' or 'standard' fitted model. Given changes in independent variables (for example, assuming the improvement of a DQ metric from X to Y) the model can provide estimated corresponding improvements in defect density, engineering hours gained, and reduced risk. All such improvements constitute the total benefit of a proposed software initiative, and may be discounted over the expected lifetime of the system.

Once total cost, benefit, and duration of a hypothetical initiative have been determined it is possible to treat the initiative as a revenue stream over time. Such treatment allows a tool to calculate the Return on Investment (benefit/cost), Internal Rate of Return, Time to Breakeven, and other common financial metrics. FIG. 37 shows an example of a tool comparing such costs and benefits of two hypothetical improvement scenarios—a CQ and TQ improvement initiatives. From top to bottom given the improvement target, the scope and cost of such a change is calculated, followed by a breakdown of predicted future software economic benefit. The figure concludes with a summary of present value for each initiative, and a breakdown of common financial metrics.

Section 10: Technical Debt

Technical Debt is a financial representation of total expected cost of degraded software quality over time. This differs from typical industry definitions of Technical Debt in two ways: it considers total incurred costs (cost of engineering, cost of risk, cost of turnover, cost of lost productivity, etc.) from degraded quality instead of only cost of engineering required to correct code deficiencies, and it treats these costs as a financial instrument over time instead of as a static number.

This broader definition and treatment of Technical Debt as a financial instrument subsequently leads to two further observations: Technical Debt may be "paid" by improving software quality (thereby reducing engineering cost, mitigating risk, reducing turnover, etc.), and if not "paid" will "accrue interest" over time as software quality continues to degrade. It is essential to consider software quality and cost together when calculating Technical Debt. Real or hypothetical software improvement, while it requires an investment of funds, can measurably alter code quality in groups of files, leading to changes in cost metrics of those files and ultimately in Technical Debt. The total amount spent per year on the project (including costs from development, risk, turnover, etc.) is considered an interest payment on the system's technical debt. Using yearly interest payments and user-specified assumptions about the appropriate interest rate for capitalization, a tool can compute "principal" on the "loan." This value is the Technical Debt within the existing system.

Calculating Technical Debt involves the following stages: determining real or estimated annualized costs including lost productivity, summing these annualized costs, finally applying an appropriate capitalization rate to calculate principal on debt.

10.1 Determine Real or Estimated Annualized Cost Subtotals

Because of technical debt's emphasis on refactoring as an investment mechanism, based on available parameters and timeframe being examined, the annualized costs from technical debt in the system (cost of engineering, cost of risk, cost of turnover, cost of lost productivity, etc.) may be calculated and recorded as subtotals of debt with three different methods—real costs as recorded in the past, calibrated past cost from the system being analyzed to determine estimated cost in the future, and projected cost from external systems in the case data is missing.

Ideally real costs can be included for present and past states of the system. However, when estimating future costs multiple snapshots may be used to calibrate annual cost calculation by factoring in past rates of change along with expected rates of change in the future. If parameters are missing entirely, due to, e.g., an absence of version control or issue tracking data, modeled parameters may be projected from comparable systems to estimate future costs (For more details on projection see Section 6.).

10.2 Add Up Real or Estimated Annualized Costs

Cost subtotals, together with any other costs not falling into those categories listed, are now summed to determine an annualized cost total. This figure constitutes the total risk and project costs for that codebase over the year in question, and represents an interest payment on the system's underlying technical debt, or an expense in perpetuity that can be expected to remain similar if the system's technical debt continues at the same levels.

10.3 Apply Interest Rate and Compute Principal on Debt

Once annualized costs have been determined a capitalization rate can now be applied to finalize the calculation of a system's Technical Debt. The interest rate for capitalization is a user-modifiable parameter that can be reasonably approximated by the interest rate for high-yield bonds, around 6-7%. The interest rate can be combined with the number of years the codebase is expected to remain in service, T, using the following standard formula:

$$CapRate = \sum_{t=1}^{T} \frac{1}{(1+r)^t}$$

Note that for a codebase expected to last in perpetuity, the CapRate=1/r. Value in perpetuity is a good approximation for an expected life of 40-50 years.

Multiplying the interest payment (total risk and project costs) by the CapRate allows a tool to calculate a capitalized value for those costs. This can also be done for the subtotals before they are added together, allowing capitalized values to be calculated for each segment of the total interest payment.

The capitalized value of the total risk and project costs is a liability for future payments that represents the total technical debt of the system. This may be thought of as the "principal" on a loan with contractual payments equal to the project costs. Together with the segmented technical debt totals (technical debt from cost, technical debt from risk, technical debt from turnover, technical debt from lost productivity, etc.), these figures present the user with a more generalized summary of the project's technical debt profile.

10.4 Applying Technical Debt to Software Valuation

Effectively determining Technical Debt now provides a key missing factor when determining the value of a software asset. When performing due diligence (during, for instance, an acquisition) the total value of a software asset should be represented as the value of that software asset (the total of both engineering cost necessary to create another software asset with an equivalent feature set AND the expected revenue stream enabled by that software asset) minus the cost of that software asset (Technical Debt). The cost of a software asset has traditionally not been included when performing such valuations, and can now reasonably represent the total value of the software asset.

Section 11: Applications of Business Outcome Methods and Metrics

The methods described in previous sections allow the tool to calculate various business outcomes such as technical debt, maintainability, agility, cost, etc. This section describes some examples of ways to apply the methods outlined above. There are numerous potential applications of these methods, including but by no means limited to the examples given in this section. These examples are intended to serve as demonstrations of the types of outcomes that the tool is able to produce, with the understanding that various alternative applications are possible depending on project specifications, users' needs, and further developments and refinements in the tool's capabilities.

11.1 Technical Debt Balance Sheet

As an example application of the tool and its methods, the Technical Debt Balance Sheet (TDBS) provides a detailed breakdown of the various elements of a codebase and its development process that contribute to technical debt. It presents technical debt figures for a particular snapshot of the project, incorporating user-defined parameters into its calculations; in addition, it provides estimations of future technical debt based on hypothetical or actual refactoring efforts, and ultimately calculates various high-level financial outcomes to aid decision-making processes.

11.1.1 Description

Figure 38:
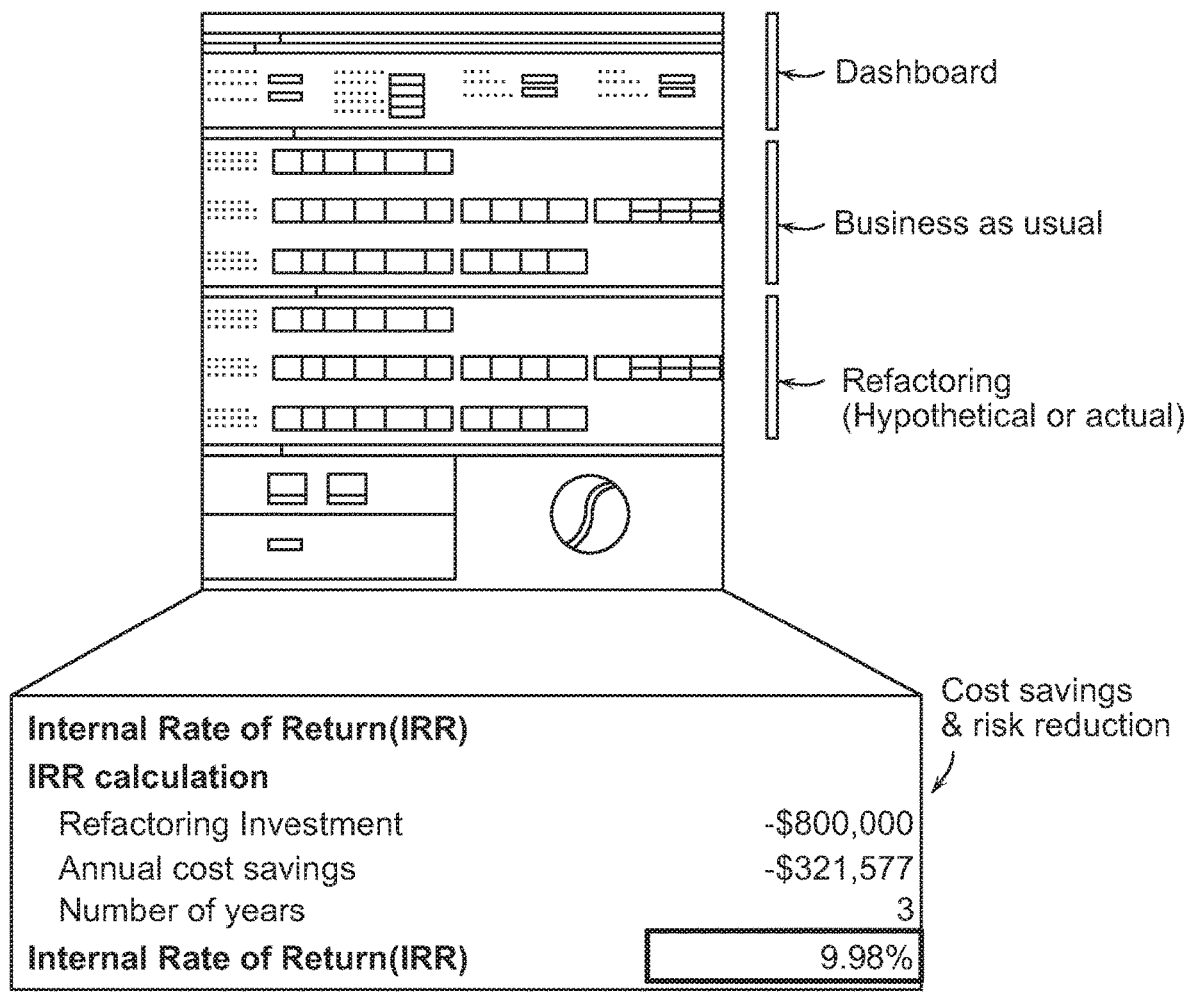
FIG. 38 shows an exemplary technical debt balance sheet with subdivisions.

The technical debt balance sheet provides a single-page breakdown of the technical debt calculations for a snapshot of a single project at a single point in time. As shown in FIG. 38, the sheet is divided into 4 major areas:

(1) The dashboard contains a number of user-modifiable parameters whose values affect the calculations on the rest of the sheet. These include general financial parameters (developer salary, expected cost per defective LOC shipped, and interest rate for technical debt capitalization) as well refactoring-related parameters (time and investment allotted to refactoring, as well as expected success rate), which may be applied to both hypothetical and actual refactoring calculations, depending on the circumstances.

(2) The business as usual (BAU) area shows various calculations dealing with the project at a particular moment in time, culminating in technical debt totals at that time. The calculations for this section are derived from the methods described in section 5, drawing from the same body of data as well as dashboard input; the data can be either fully calibrated or partly projected, as detailed in section 6.

(3) The refactoring area computes new values for each element in the BAU area based on the outcome of a refactoring effort, which may be hypothetical or actual. A hypothetical refactoring effort incorporates values from the dashboard to compute projected changes, while a real refactoring effort incorporates values from a second snapshot, which may be calibrated or partly projected. Like BAU, its ultimate outputs are hypothetical or real technical debt figures.

(4) The cost savings & risk reduction area computes the difference between the BAU and refactoring areas, the amount of technical debt paid down, and, finally, the net present value (NPV) and internal rate of return (IRR) from refactoring, which provide a summary of the financial value of the refactoring effort in terms of return on investment.

Taken as a whole, the TDBS provides a high-level, customizable overview of a given system's current technical debt situation and associated financial parameters, while also enabling the user to understand the value of a past or future refactoring effort intended to improve code quality and design quality.

11.1.2 Projection and Calibration

As with other types of modeled calculations that the tool can produce, the TDBS calculations can be calibrated from real data or projected from Zoo-based estimates. If the codebase and the full complement of project management data are available for the BAU calculation, real business outcome metrics can first be modeled as described in section 4, then technical debt can be calculated as outlined in section 5 using the same subtotals (bugfixing/feature costs, risk, and turnover), which are then annualized, summed, and capitalized. If the full complement is not available, the missing project metrics can be bypassed by the model, which can use Zoo data to directly determine projected business outcome metrics.

The financial parameters in the dashboard can be considered "tunable dials," whose manipulation by the user can reveal new insights about the interrelated elements that compose the technical debt calculations. Well-informed estimation on the part of users can be important here. For instance, the cost of defective LOC shipped will depend on the criticality of the system: bugs in critically important software, such as military systems or transportation infrastructure, will have substantially greater impact than bugs in software with less life-or-death functionality. For consistency, these same financial parameters will also affect hypothetical refactoring calculations. Paradigms of user interaction other than the "tunable dial" mechanism, such as graphical representation of a variety of scenarios, are conceivable alternative developments in the structure of the TDBS.

11.2 IRR/ROI Retrospective Cost Benefit of Refactoring: Compare Two Balance Sheets (Actual Before, Actual after)

A primary benefit of the TDBS is the option of comparing before-and-after scenarios with regard to the refactoring of a project, either actual or hypothetical, to determine the internal rate of return (IRR). In the case of an actual refactoring, the TDBS will have at least two datasets available: a snapshot of the system at a given time, and a second snapshot at a later time, after some degree of refactoring has occurred. The snapshots do not necessarily have to be taken before and after a large-scale refactoring effort: it is also possible to take a number of snapshots throughout the process and compare them, in pairs or other groupings, to get a sense of the ongoing value of a refactoring effort (or lack thereof).

In the actual vs. actual scenario, the two balance sheets are calculated in essentially the same way as each other. It can generally be assumed in most cases that project management systems will not have been newly attached to or detached from the codebase in the interim between the first and second snapshots; therefore, the two snapshots should have the same proportion of calibrated vs. projected metrics. Careful attention should be paid to which metrics, if any, are being held constant between the two snapshots.

11.2.1 Refactoring Inputs or Calculations

Another important component of the actual vs. actual calculations is the set of parameters related to refactoring, either derived from user-modified dashboard inputs or from calculations of the differences between the two snapshots. All systems can use basic financial parameters from the dashboard, and will be able to calculate real refactoring-based changes purely in codebase-extracted code metrics, i.e. refactoring success rates. Using architectural quality and file complexity metrics as examples, these success parameters might include the proportion of files shifted from high-centrality to low-centrality areas of the code, or the proportion of files shifted from high complexity to low complexity, and so on. (Other success metrics are conceivable, based on different quality metrics.)

The methods of determining other refactoring parameters will vary between fully calibrated and partially projected systems. The amount of time and resources dedicated to the refactoring effort should be calculable from real data in fully calibrated systems, but will involve some projection (based on Zoo data) in less calibrated systems.

11.2.2 Deltas with IRR

Once the two sheets have been set up correctly, the internal rate of return calculation can take place to factor in the opportunity cost of the capital outlay required to undertake the refactoring effort. The IRR is defined as the rate of return for the total of all the project's cash flows at which the net present value (NPV) becomes equal to zero, or breaks even. The NPV over n periods (considering the initial investment to be n=0), conversely, is calculated by dividing each of the n cash flows by the nth power of the sum of 100% and the IRR, then summing all n terms.

The annual cost & risk difference between the older snapshot and the newer one—representing some degree of savings over time, assuming that the refactoring has been effective—is the annual cash flow, while the user can define both the number of years that the refactoring is expected to take and the initial refactoring investment in the dashboard. The IRR calculation then returns a simple value that allows the user to determine whether or not the refactoring was worth the cost.

11.3 IRR/ROI Prospective Cost Benefit of Refactoring: Actual Before, Hypothesized after In the event that no refactoring has yet occurred in a codebase, technical debt calculations from the most recent snapshot can be compared with a hypothesized snapshot at a future point in time to determine the expected IRR of a hypothetical refactoring effort. The mechanism for projecting this future snapshot entails using Zoo data to estimate the degree to which, given a certain user-defined input of time and resources, a particular improvement in code and design quality will result, using methods such as shifting files between different sectors in order to strengthen quality metrics.

11.3.1 Projecting Complexity Reduction with Data from Other Projects

Obtaining an accurate estimation of the hypothetical refactoring effort's success rate is dependent on several user-supplied factors about the purpose and high-level situation of the system. For example, if the codebase is growing rapidly, refactoring will be more difficult, as new features (and bugs) are constantly being produced; if the codebase is in "maintenance mode," on the other hand, it can be anticipated that refactoring efforts will be more effective due to the low degree of interference from new code. Alternatively, to simplify the initial calculations, it may be desirable to assume that normal feature development and other change in the codebase is minimized during the refactoring period: total lines of code remain the same, and efforts focus on maximizing the refactoring success rate.

Assuming that the success rate has been accurately estimated, the hypothetical future snapshot of the system will now have a new set of code metrics. Plugging these code metrics into the Zoo-derived projection formulas will generate projected business outcome metrics, which can be combined with the code metrics to calculate hypothetical technical debt.

11.3.2 Deltas with IRR

Once the second snapshot has been estimated, the IRR calculation proceeds in much the same way as with the actual vs. actual case. Adjusting the hypothetical outcomes of the refactoring effort (e.g. by increasing or decreasing the percentage of files moved to less complex areas of the code) thus produces instantly visible results for the user in terms of how the IRR would change.

11.4 Technical Debt Cash Flow Analysis 11.4.1 Simulated Project Evolution with Multiple Balance Sheets Another potential application, which may be considered an extension of the TDBS, is a longitudinal cash flow analysis of changes in technical debt over time. This can be constructed from a series of balance sheets, each feeding forward into the next, then using projection modeling techniques to make predictions based on different amounts and time periods of real or hypothetical refactoring. In essence, this is a project management and staffing tool that simulates the evolution of a codebase and project over time to provide estimations of long-term future cash flows.

11.5 Determining Contractor Efficiency Based on Estimated Difficulty

Another potential use case of the tool is allowing the owner of a codebase to determine the efficiency rate of external organizations that have been contracted to maintain or develop that codebase. If file-level productivity rates (feature and bug) and defect ratios can be modeled with reasonable accuracy with the amount of project and system data available, then it is possible to calculate the length of time it should take to write a given amount of lines of code in each file. Over a sufficient period of time and number of files, the degree to which a contracting organization's work rate matches or deviates from expectations should become evident, allowing the user to make informed decisions about current and future development and maintenance contracts.

Figure 39:
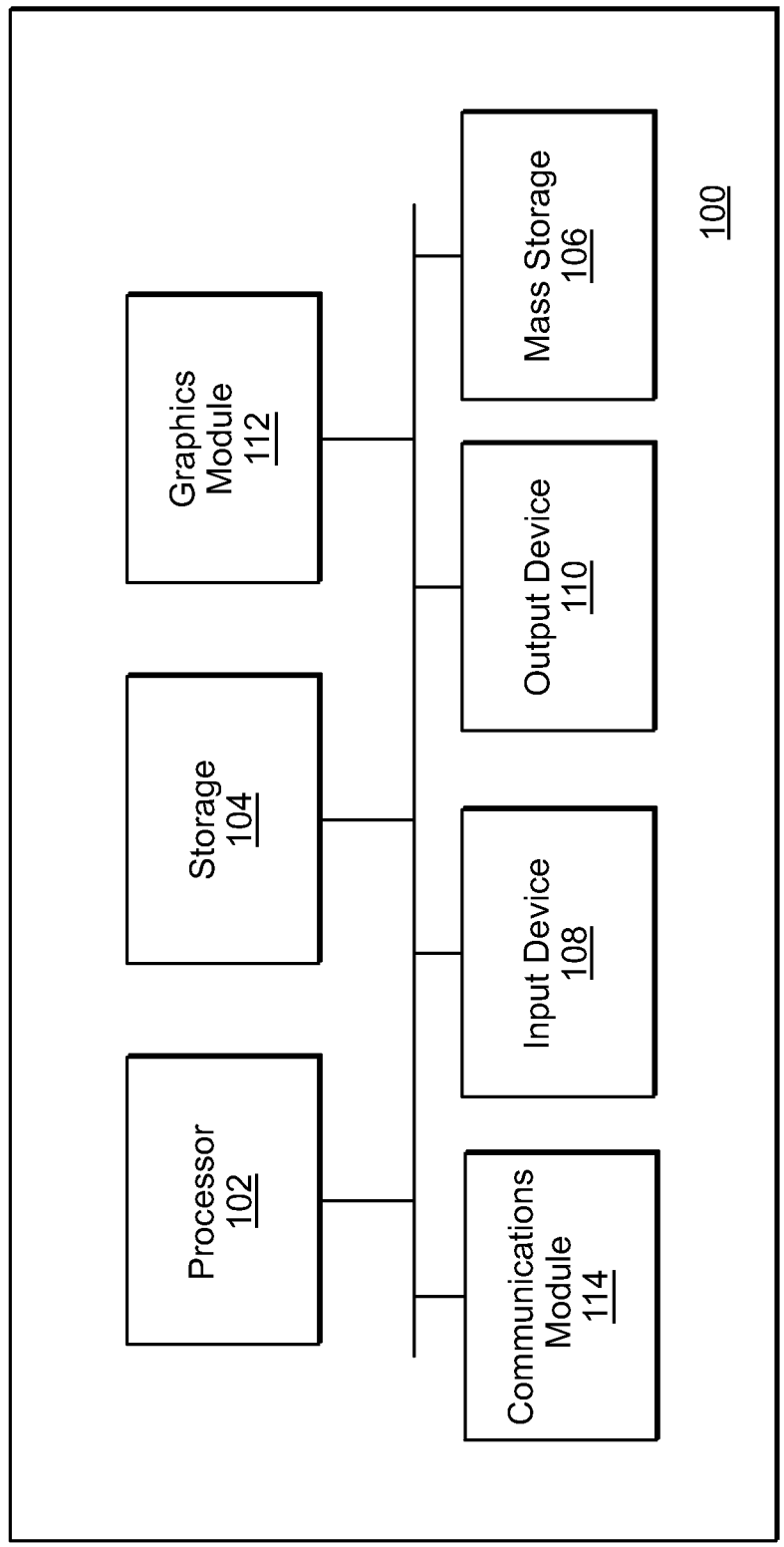
FIG. 39 is a block diagram illustrating an exemplary computer system.

The methods, operations, modules, and systems described herein may be implemented in one or more computer programs executing on a programmable computer system. FIG. 39 is a simplified block diagram illustrating an exemplary computer system 100, on which the computer programs may operate as a set of computer instructions. The computer system 100 includes, among other things, at least one computer processor 102, system memory 104 (including a random access memory and a read-only memory) readable by the processor 102. The computer system 100 also includes a mass storage device 106 (e.g., a hard disk drive, a solid-state storage device, an optical disk device, etc.). The computer processor 102 is capable of processing instructions stored in the system memory or mass storage device. The computer system additionally includes input/output devices 108, 110 (e.g., a display, keyboard, pointer device, etc.), a graphics module 112 for generating graphical objects, and a communication module or network interface 114, which manages communication with other devices via telecommunications and other networks.

Each computer program can be a set of instructions or program code in a code module resident in the random access memory of the computer system. Until required by the computer system, the set of instructions may be stored in the mass storage device or on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

The invention claimed is:

1. A computer-implemented method of analyzing a computer software codebase, comprising the steps performed by one or more computer systems of:
   (a) scanning the codebase using an analysis tool to capture and store information about the structure, properties, or metrics of the codebase;
   (b) inputting the information captured in (a) into one or more fitted statistical models to generate software economic output metrics for the software codebase, said software economic output metrics including defect density projections and/or developer productivity projections for the codebase, wherein said one or more fitted statistical models are based on custom fitted models providing estimates for low level software economic parameters, said custom fitted models created by applying statistical regression techniques to code qualify metrics, design quality metrics, and/or test quality metrics, wherein said custom fitted models are refined using correlation significance, verifying outcomes of refined models against available real data, and adding information on the verified outcomes to the codebase as a new point of information to refine the one or more fitted statistical models or the custom fitted models;
   (c) exploring the impact, using a software tool or graphical user interface, of a code quality improvement initiative, a design quality improvement initiative, or a test quality improvement initiative by adjusting code quality inputs, design quality inputs, or test quality inputs to the one or more fitted statistical models to generate updated software economic output metrics including updated defect density projections and/or updated developer productivity projections for the codebase;
   (d) computing costs associated with the defect density projections and/or developer productivity projections determined in (b) and costs associated with the updated defect density projections and/or updated developer productivity projections determined in (c);
   (e) analyzing the costs computed in (d) and outputting results thereof; and
   (f) performing the code quality improvement, the design quality improvement, or the test quality improvement of the codebase by redesigning the codebase, rewriting the codebase, refactoring the codebase, or improving automated testing of the codebase based on the results in (e).

2. The method of claim 1, wherein (d) comprises computing a return-on-investment (ROI) value for implementing the code quality improvement initiative, the design quality improvement initiative, or the test quality improvement initiative based on the costs computed in (d).

3. The method of claim 1, wherein (e) comprises computing a break-even time value for implementing the code quality improvement initiative, the design quality improvement initiative, or the test quality improvement initiative based on the costs computed in (d).

4. The method of claim 1, wherein (e) comprises computing a rate of return value for implementing the code quality improvement initiative, the design quality improvement initiative, or the test quality improvement initiative based on the costs computed in (d).

5. A computer-implemented method of determining a technical debt of a computer software codebase, comprising the steps performed by one or more computer systems of:
 (a) scanning the codebase using an analysis tool to capture and store information about the structure, properties, or metrics of the codebase;
 (b) inputting the information captured in (a) into one or more fitted statistical models to generate software economic output metrics for the software codebase, said software economic output metrics including defect density projections and/or developer productivity projections for the codebase over a period of time the codebase is expected to be in service, wherein said one or more fitted statistical models are based on custom fitted models providing estimates for low level software economic parameters, said custom fitted models created by applying statistical regression techniques to code qualify metrics, design quality metrics, and/or test quality metrics, wherein said custom fitted models are refined using correlation significance, verifying outcomes of refined models against available real data, and adding information on the verified outcomes to the codebase as a new point of information to refine the one or more fitted statistical models or the custom fitted models;
 (c) calculating a total cost of development including costs associated with fixing defects and developing new features based on the defect density projections and/or developer productivity projections over the period of time;
 (d) calculating a capitalized value of the costs calculated in (c) based on a given interest rate to determine the technical debt of the codebase;
 (e) outputting the technical debt;
 (f) exploring the impact, using a software tool or graphical user interface, of a code quality improvement initiative, a design quality improvement initiative, or a test quality improvement initiative by adjusting code quality inputs, design quality inputs, or test quality inputs to the one or more fitted statistical models to generate updated software economic output metrics including updated defect density projections and/or updated developer productivity projections for the codebase, and repeating (c), (d), and (e) based on the updated defect density projections and/or updated developer productivity projections; and
 (g) performing a code quality improvement, a design quality improvement, or a test quality improvement of the codebase by redesigning the codebase, rewriting the codebase, refactoring the codebase, or improving automated testing of the codebase based on the technical debt in (e).

6. The method of claim 5, wherein the costs associated with the defect density projections over the period of time include costs for identifying and fixing defects and costs associated with the use of the software codebase.

7. The method of claim 5, further comprising using the technical debt output in (e) for determining valuation of the codebase.

8. The method of claim 1, wherein step (a) comprises scanning the codebase using a static analysis tool to capture snapshot information about the structure, properties, or metrics of the codebase at a single point in time or multiple points in time.

9. A computer-implemented method of analyzing a computer software codebase, comprising the steps performed by one or more computer systems of:
 (a) scanning the codebase using an analysis tool to capture and store information about the structure, properties, or metrics of the codebase;
 (b) inputting the information captured in (a) into one or more fitted statistical models to generate first level software economic output metrics for the software codebase, said first level software economic output metrics including at least one of: defect density or developer productivity projections for the codebase, wherein said one or more fitted statistical models are based on custom fitted models providing estimates for low level software economic parameters, said custom fitted models created by applying statistical regression techniques to code qualify metrics, design quality metrics, and/or test quality metrics, wherein said custom fitted models are refined using correlation significance, verifying outcomes of refined models against available real data, and adding information on the verified outcomes to the codebase as a new point of information to refine the one or more fitted statistical models or the custom fitted models;
 (c) receiving additional information including at least one of: benchmark data collected from analysis of other codebases unrelated to said codebase, information related to version control or change management systems, and user input parameters;
 (d) using the first level software economic output metrics generated in (b) and the additional information received in (c) to generate second level software economic output metrics including at least one of: metrics related to maintainability, agility, cost, risk, defects, waste, security, technical debt, and schedule, and outputting the second level software economic output metrics; and
 (e) performing a code quality improvement, a design quality improvement, or a test quality improvement of the codebase by redesigning the codebase, rewriting the codebase, refactoring the codebase, or improving automated testing of the codebase based on the generated second level software economic output metrics in (d).

10. The method of claim 9, wherein the user input parameters include at least one of: information on amount of code modified over a given time period, information on the number of developers for the codebase, development cost over a given period of time, information on labor to be expended before decommissioning of the codebase, downstream cost of bugs in the codebase, developer salaries, and financial discount rate.

* * * * *